July 31, 1956 K. J. BRAUN 2,756,824

RECORD SENSING AND SELECTIVE PUNCHING MEANS

Filed Sept. 17, 1953 12 Sheets-Sheet 1

Inventor
KARL J. BRAUN

By George V. Eltgroth
John C. Sterling
Attorneys

July 31, 1956
K. J. BRAUN
2,756,824
RECORD SENSING AND SELECTIVE PUNCHING MEANS
Filed Sept. 17, 1953
12 Sheets-Sheet 2
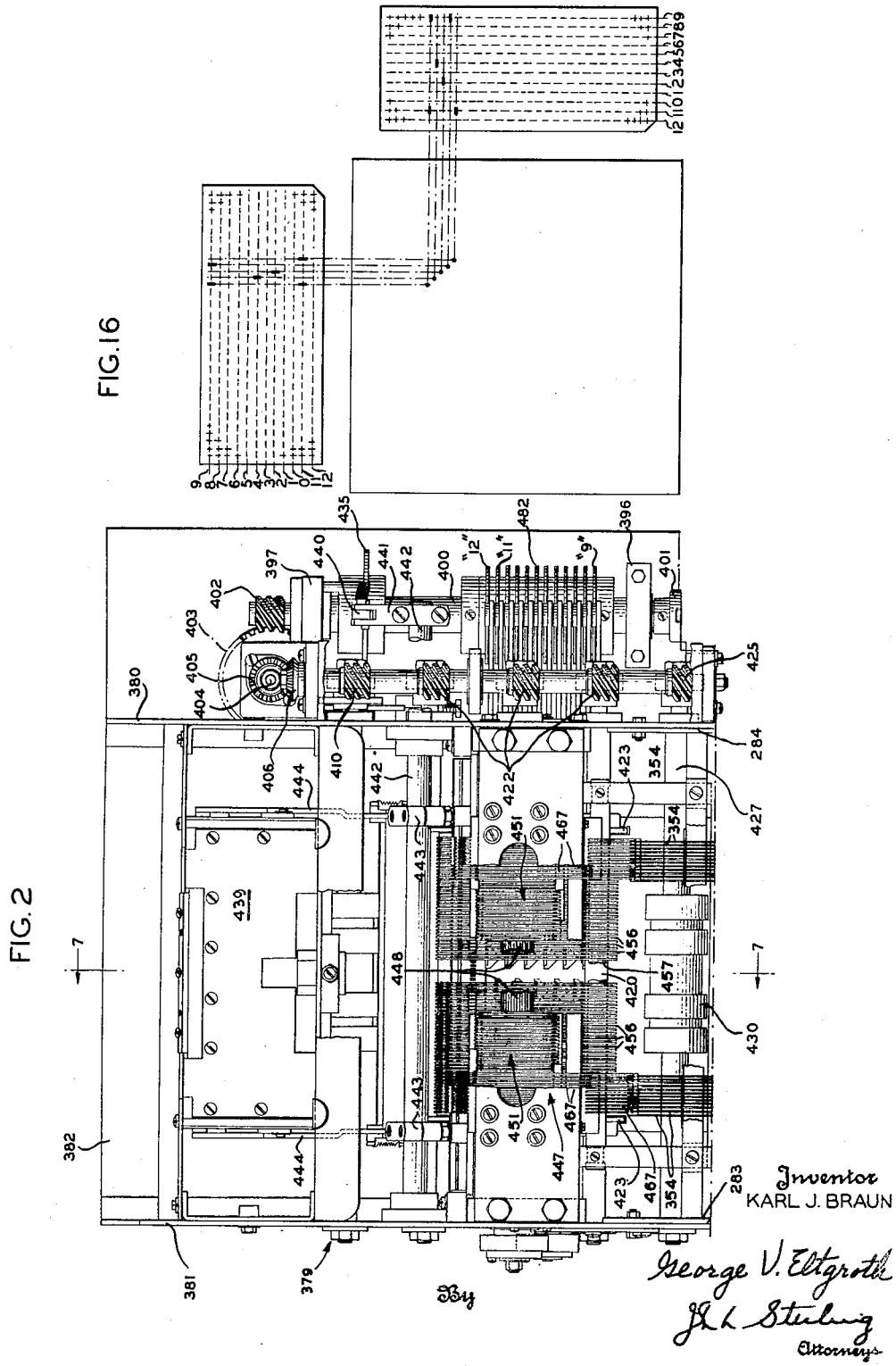
Inventor
KARL J. BRAUN
By George V. Eltgroth
J. L. Sterling
Attorneys

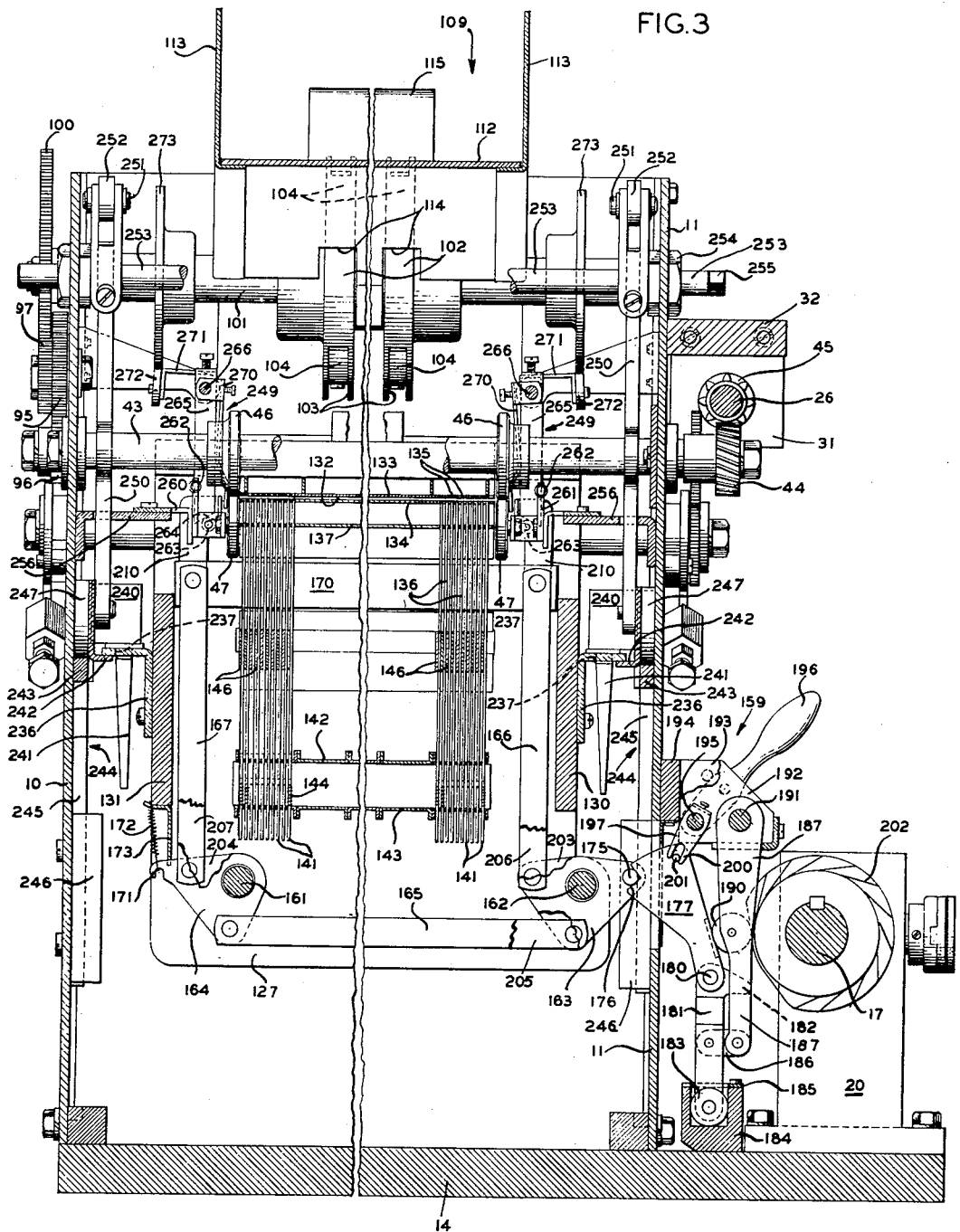

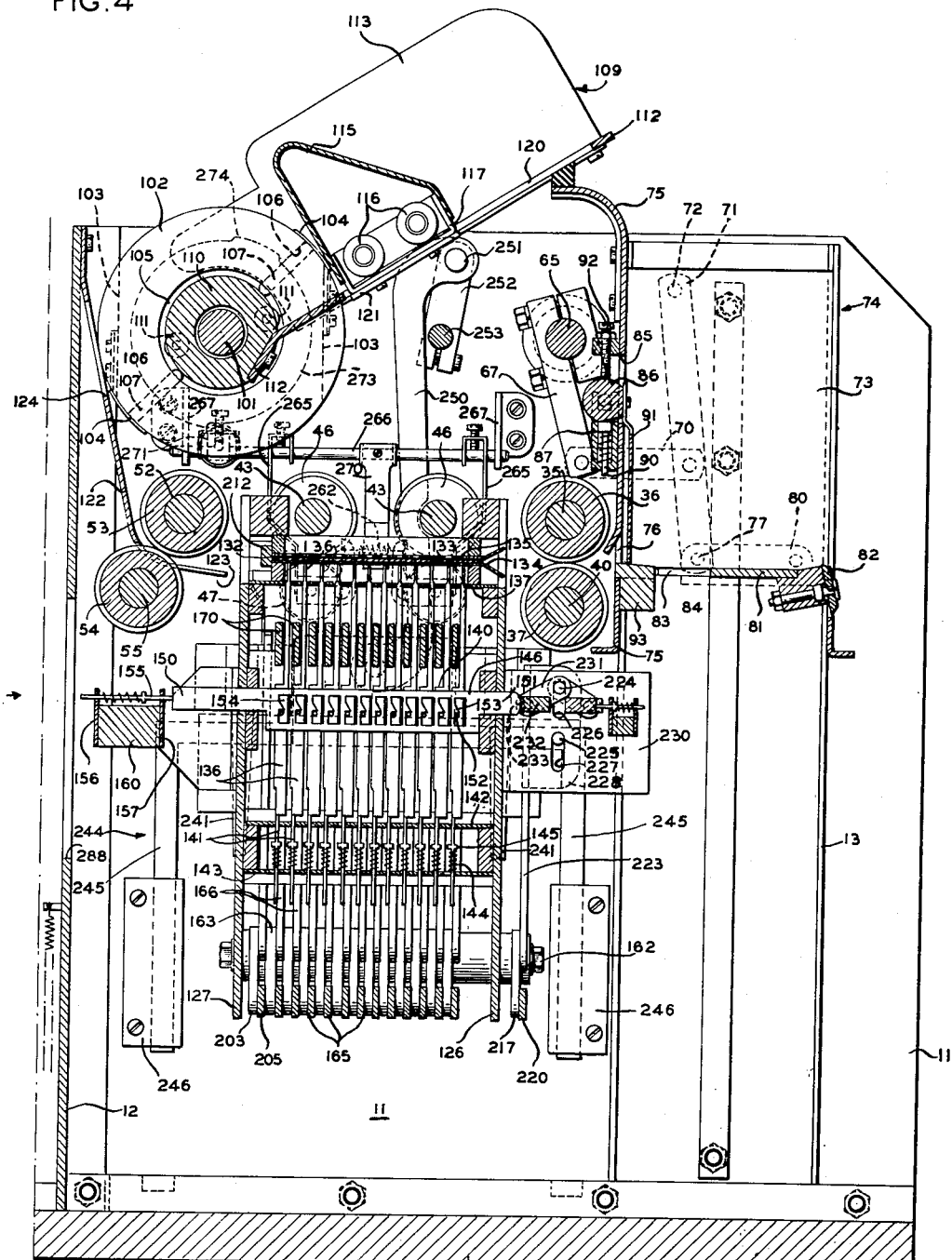

July 31, 1956  K. J. BRAUN  2,756,824

RECORD SENSING AND SELECTIVE PUNCHING MEANS

Filed Sept. 17, 1953  12 Sheets-Sheet 5

INVENTOR.
KARL J. BRAUN
BY George V. Eltgroth
ATTORNEYS

July 31, 1956     K. J. BRAUN     2,756,824

RECORD SENSING AND SELECTIVE PUNCHING MEANS

Filed Sept. 17, 1953     12 Sheets-Sheet 6

*INVENTOR.*
KARL J. BRAUN

BY George V. Eltgroth

ATTORNEYS

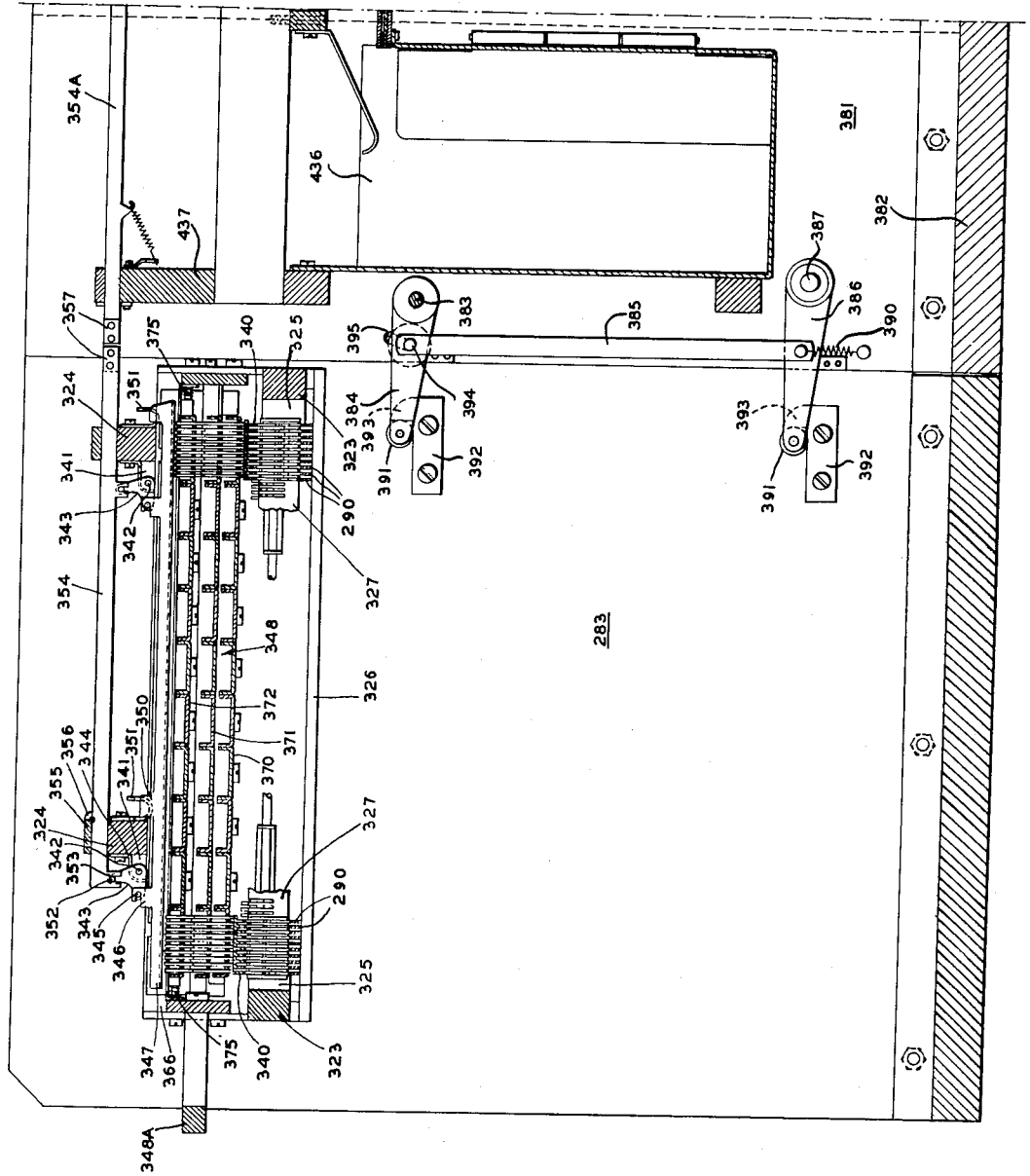

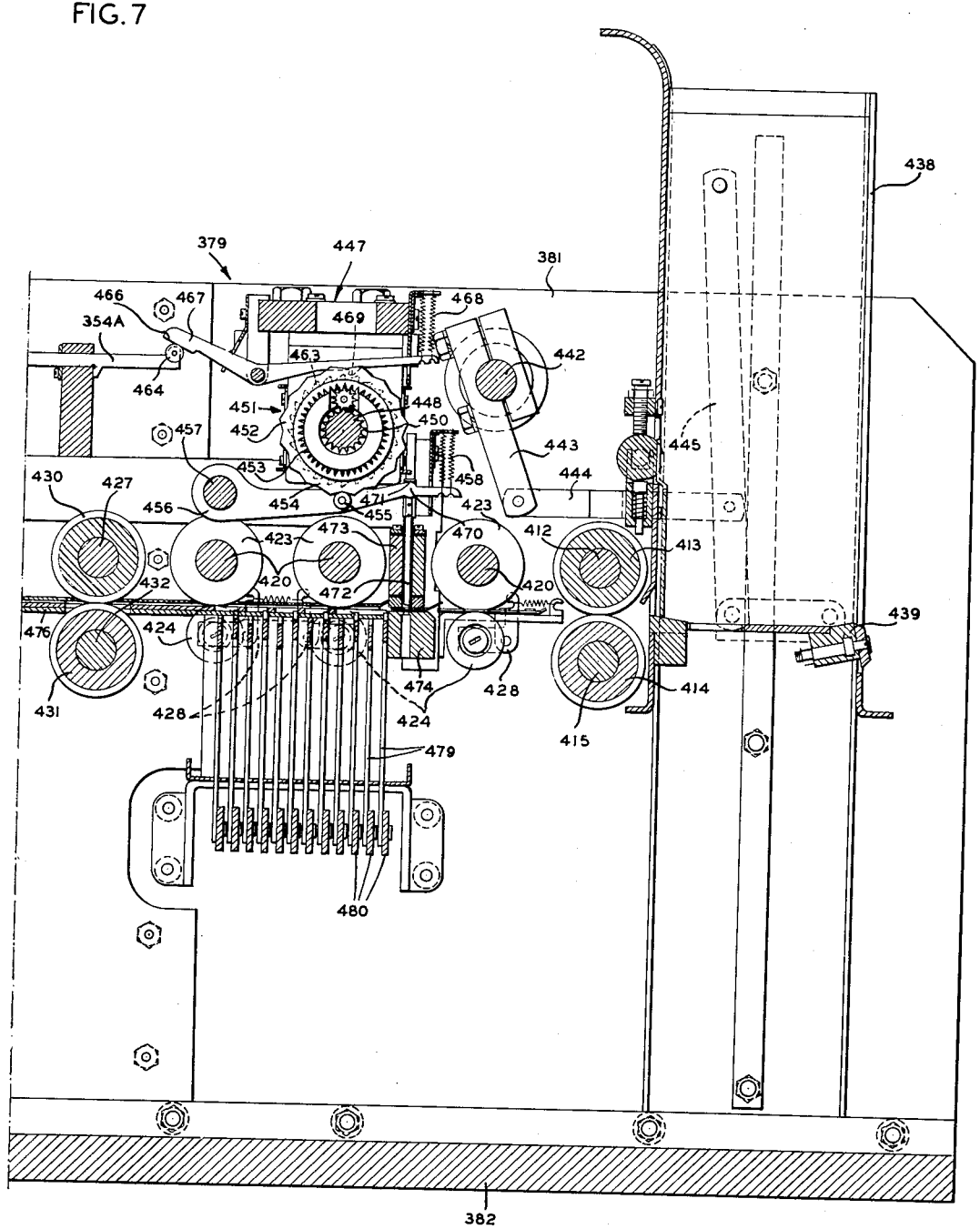

July 31, 1956  K. J. BRAUN  2,756,824
RECORD SENSING AND SELECTIVE PUNCHING MEANS
Filed Sept. 17, 1953  12 Sheets-Sheet 9
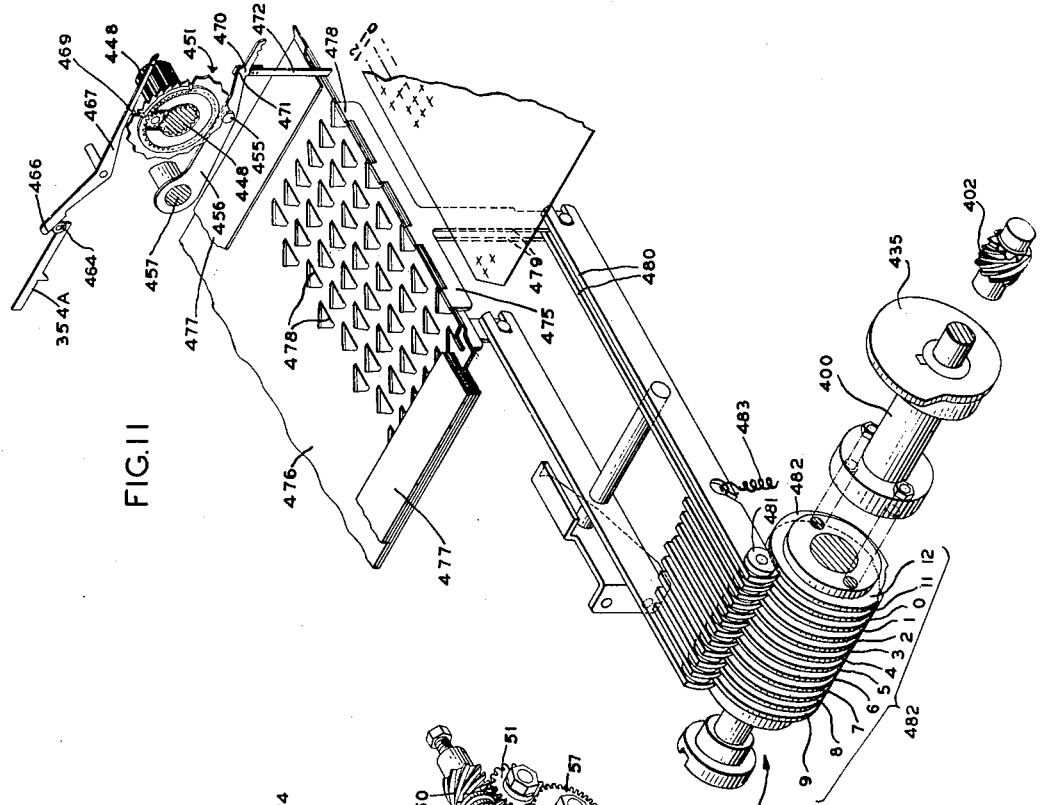
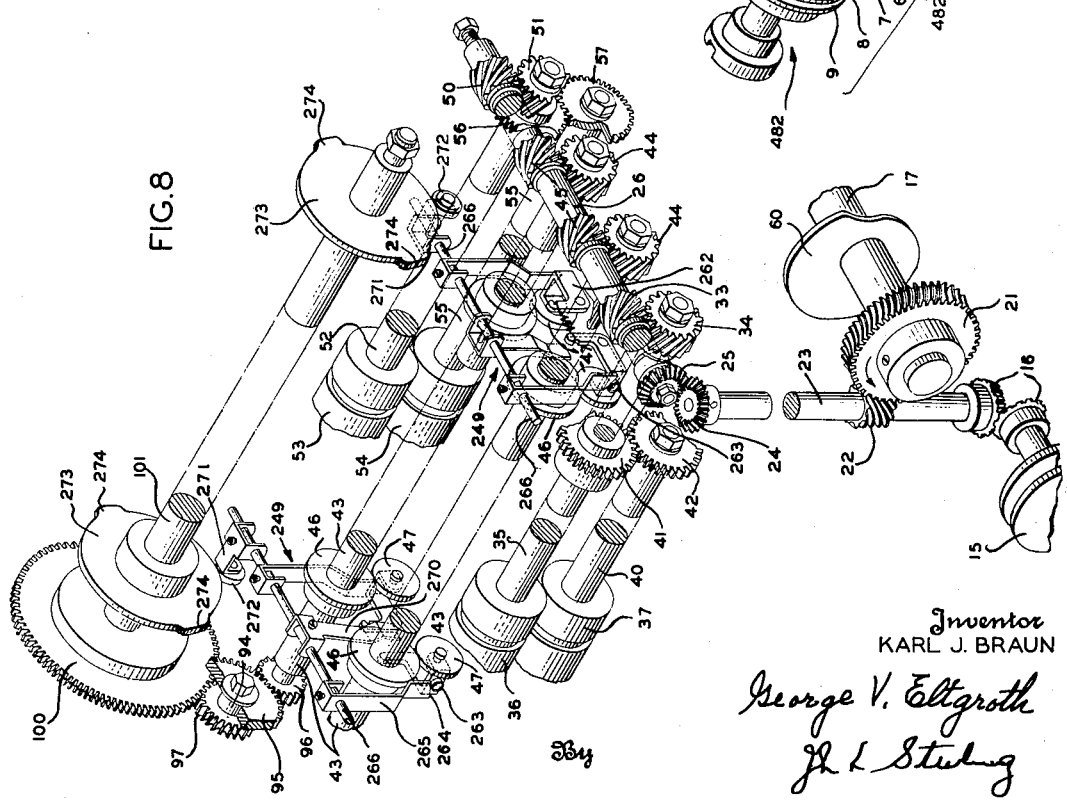
Inventor
KARL J. BRAUN
By George V. Eltgroth
J. L. Sterling
Attorneys

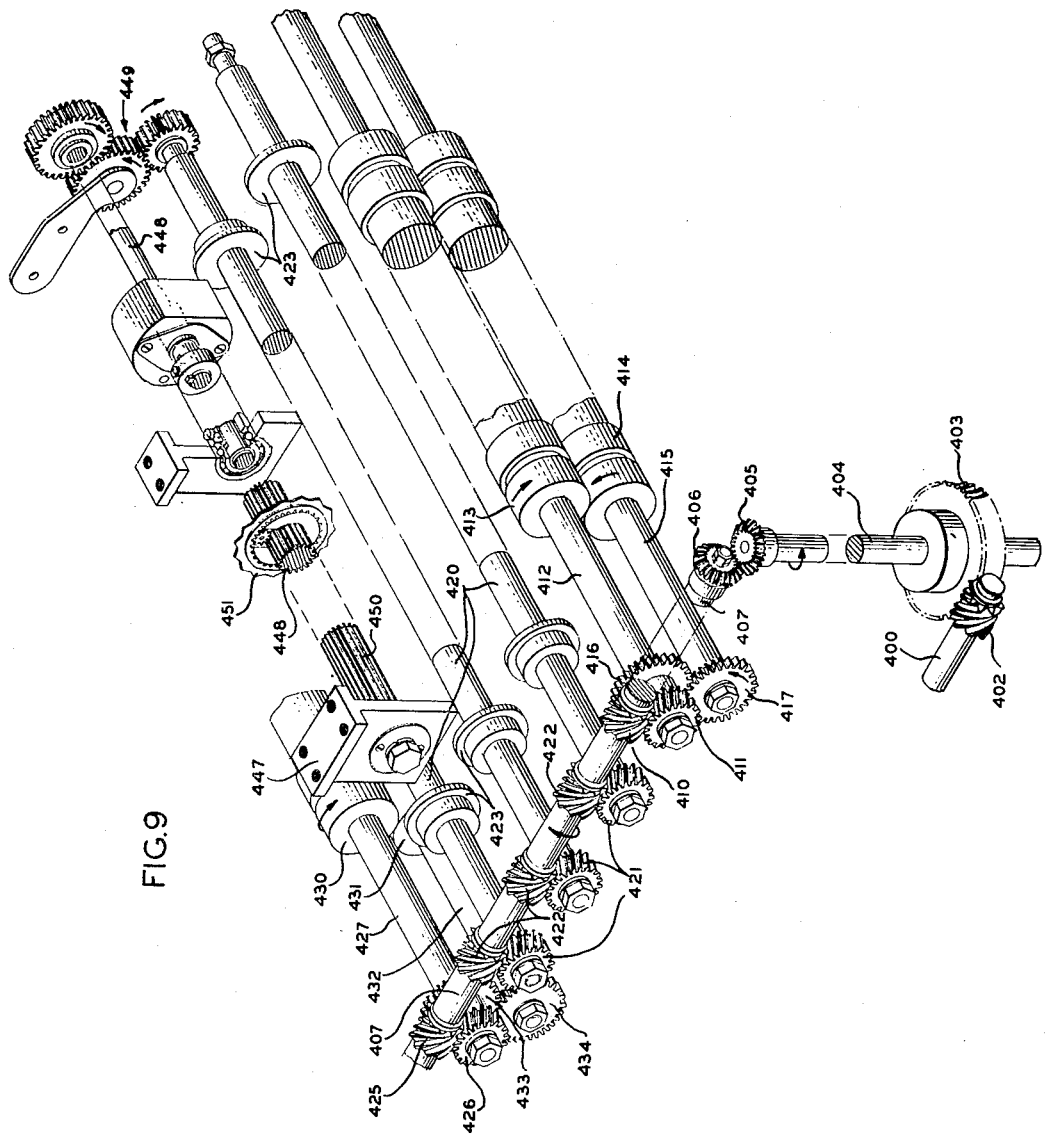

July 31, 1956  K. J. BRAUN  2,756,824
RECORD SENSING AND SELECTIVE PUNCHING MEANS
Filed Sept. 17, 1953  12 Sheets-Sheet 11

Inventor
KARL J. BRAUN
George V. Ettgroth
J. L. Sterling
Attorneys

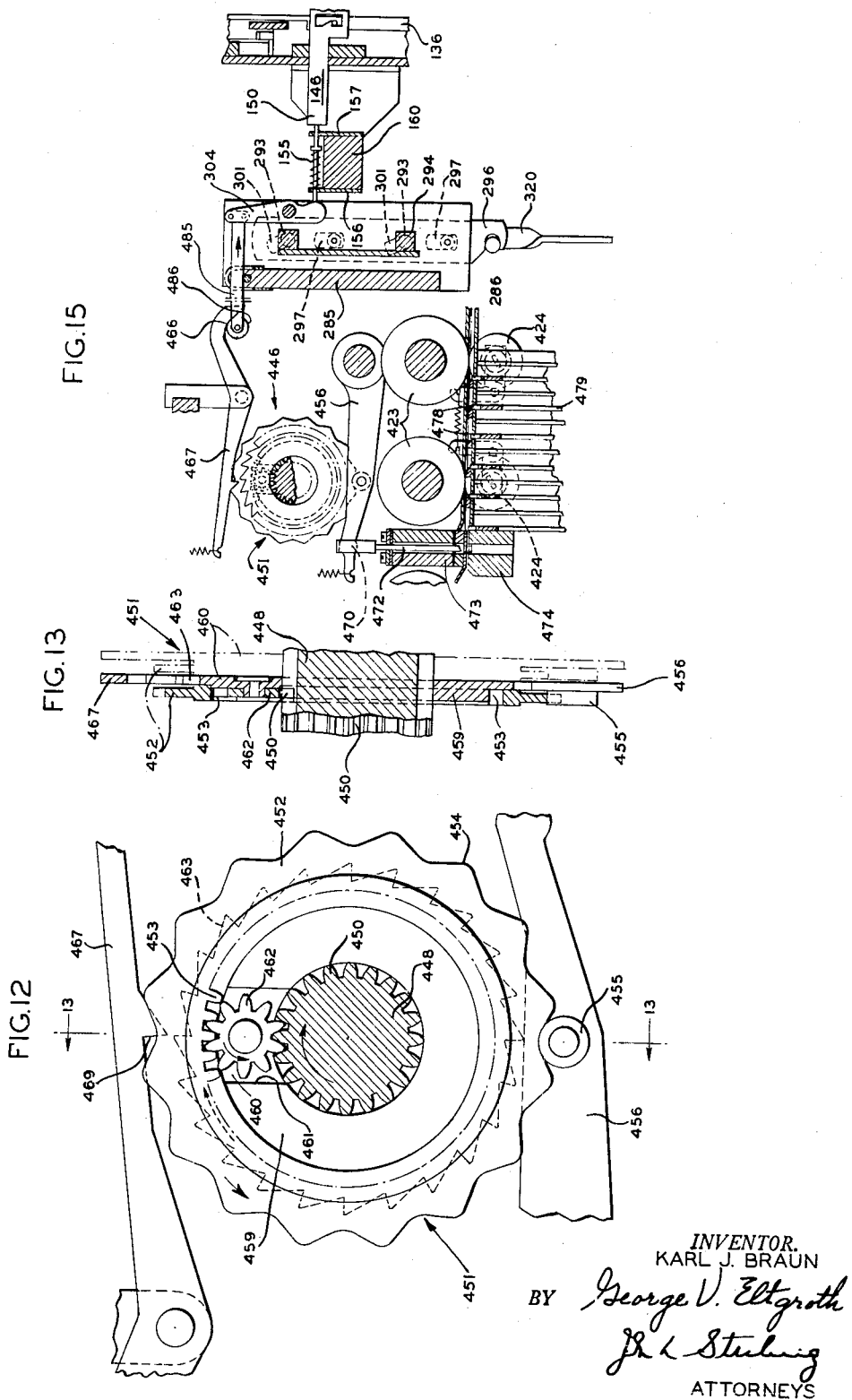

United States Patent Office 2,756,824
Patented July 31, 1956

2,756,824

RECORD SENSING AND SELECTIVE PUNCHING MEANS

Karl J. Braun, Glenbrook, Conn., assignor to Sperry Rand Corporation, a corporation of Delaware Application September 17, 1953, Serial No. 380,658

16 Claims. (Cl. 164—114)

This invention relates to card controlled statistical machines, and in particular to data sensing, data transposing, and data punching mechanisms as embodied therein.

In business machines, in which the data punched in control cards is sensed mechanically, the time consumed in obtaining the results of the sensing and its transfer through the machine to obtain the end result of printing or punching has not equalled the speed with which these results have been obtained as the result of electrical impulses. In the use of electrically controlled equipment, constant surveillance is necessary due to failure of contacts, relays and other circuit controlling factors, and in order to overcome these faults it is an object of the present invention to provide mechanical impulse controls for the various operations of sensing, transposing and punching as employed in the statistical machine field.

A particular object of the invention is to sense all of the perforations of a data card simultaneously, and then send out mechanical impulses in sequence from the sensing mechanism to control the punching of other cards through an impulse transferring mechanism.

A still further object of the invention is to increase the speed at which mechanical sensing and punching may be accomplished by decreasing the amount of mechanism heretofore deemed necessary and reducing the retarding effect of friction by the simplification of said mechanism.

Another object of the invention is to provide for the punching of rectangular holes at any data index position in a card without the necessity of making a die plate having openings at each index position, which latter has been found objectionable because of the difficulty of punching a large number of closely spaced holes in a plate with its resultant high cost and variation in spacing due to temperature changes.

Other objects include provisions for the simultaneous sensing of all of the data punched in a record card and the progressive transfer of the data to another unit such as a punch; the progressive feed of a card to be punched in successive actions of a minimum number of punching elements; a novel punch operating means responsive to impulses produced by the sensing mechanism; and selectively settable means whereby the alphabetical and numerical data sensed in any zone or field of a record card can be punched in any desired zone or field of another card.

With these and incidental objects in view, the invention consists in certain novel features of construction and combinations of parts, the essential elements of which are set forth in the appended claims, and a preferred embodiment of which is hereinafter described with reference to the drawing, in which Figs. 1 and 2 combine to show in plan, a machine in which the invention is embodied, Fig. 1 illustrating the card feeding and sensing sections and Fig. 2 showing the card punching section;

Fig. 3 is a vertical section taken on the line 3—3 of Fig. 1 showing the card positioning and impulse producing means;

Fig. 4 is a vertical section taken on the line 4—4 of Fig. 1 showing the relative positions of the data card magazines and the sensing mechanism;

Fig. 6 is a vertical section taken on the line 6—6 of Fig. 1 showing the arrangement of pin trays providing interponents between parts of the impulse means;

Fig. 7 is a vertical section taken on the line 7—7 of Fig. 2 and may be combined with Fig. 6 to show the punch mechanism and its operating means;

Fig. 8 is a view in perspective of the drive mechanism for operating the card feed and positioning means at the sensing end of the machine;

Fig. 9 is a view in perspective of the drive mechanism for operating the card feed and perforating mechanism at the punch end of the machine;

Fig. 11 is a view in perspective showing card stops and impulse conveying means for card punching;

Fig. 12 is an enlarged face view of one of the punch actuators;

Fig. 13 is a section on the line 13—13 of Fig. 12;

Fig. 15 is a fragmentary section of the parts of the sensing and punching mechanism showing how they may be used without the transposing mechanism; and Fig. 16 is a diagrammatic view showing how the data of the sensed card is transposed for use in the punched card.

Well known types of business machine controlling cards include one using round holes and the other using rectangular holes or slots. These latter cards have twelve data designation or index hole positions in each one of eighty columns. Slotting the cards has presented the problem of making a die plate with nine hundred and sixty small rectangular openings which is costly, and has many disadvantages due to changes in temperature and differences in the rates of expansion between the metal of the die plate and the punch holder. In order to employ a single row of die openings in a strip, so that the card can be punched in row by row order, use is made of a sensing mechanism which will sense the entire card to be reproduced in a single action of the sensing pins and then transfer the sensings in row by row order to be used in the punching operation. Through the use of this mechanism it is possible to transfer, from a sensed card to a card to be punched, a pattern of perforations from any location in the sensed card to any location in the card to be punched. Also while slotted cards are exemplified in the description herein, it is evident that cards employing round holes, arranged in upper and lower zones and in combinational or straight code, can be sensed and reproduced by punching within the compass of the invention.

Figure 1:
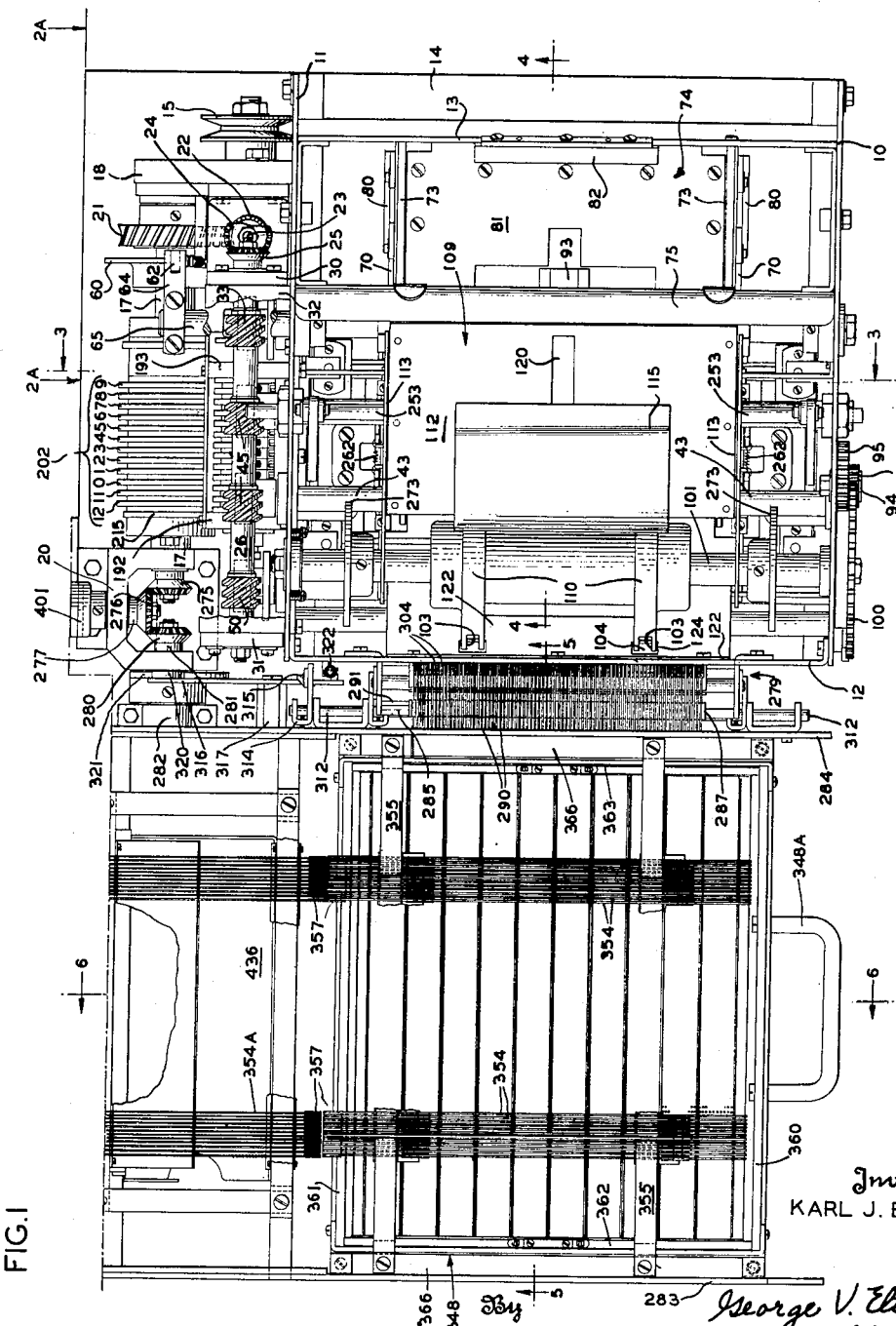

The general structure of the machine is illustrated diagrammatically in the combined Figs. 1 and 2. The cards are fed to a sensing chamber, one at a time, from a magazine. The sensing pins sense the entire area of the card at once, and those that enter a hole in the card will position a stud above the cam nose of a locking slide. Each horizontal row of pins is then pushed down in succession by restoring bars, and the stud on each of those pins that has sensed a hole will cam the respective slide to actuate a crossbar mechanism in accordance with the selective arrangement of lift pins forming a part of said mechanism and carried in a removable tray disposed between the crossbars. The tray may have upward of 6400 holes, in which the pins can be arranged, so that no matter where the data is sensed in the record card it can be punched in any selected location in the reproduced card. The sensing of the record is done all at once, but successive impulses are produced by the ripplelike operation of the restoring bars which are drawn down in succession by a series of cams. This ripple action of the crossbar mechanism will condition a punch mechanism in successive actions to perforate corresponding data in a card to be produced.

The cams, for successively operating the restoring bars, are coordinated in action with a set of cams that successively raise and lower card stops, so that the card to be punched is fed against the first stop to be punched with one or more holes in the top row (in any column), and then against the second stop, and so on until the entire card is punched in twelve operations of the punch corresponding to the ripple action of the restoring bars of the sensing mechanism.

The present machine comprises three sections, namely, sensing, transposing, and punching, each of which will be described separately and in detail.

As seen in the drawing, and particularly in Figs. 1, 2, 2A and 3, side plates 10, 11, 12, and 13 are arranged vertically on a base plate 14 and form a boxlike structure to house and support those elements in the machine comprising the sensing section.

From a suitable source of power through a pulley 15 and miter gears 16, a vertical shaft 23 is driven to operate a countershaft 17 through a worm wheel 21 and a worm 22 mounted on said shafts 17 and 23, respectively. The shaft 17 is journaled in a bracket 18 and in a casting 20, both of which are mounted on the base plate 14.

The upper end of the vertical shaft 23 carries a miter gear 24 adapted to mesh with and drive another miter gear 25 fixed on the end of a horizontal shaft 26 journaled in brackets 30 and 31 secured to a supporting bar 32 fastened to the plate 11 (Figs. 1 and 3).

A spiral gear 33 on shaft 26 adjacent bracket 30, drives a spiral gear 34 fast on one end of a card feed roll shaft 35 (Fig. 4) journaled between the plates 10 and 11. The shaft 35 is provided with a card feed roll 36 adapted to cooperate with a pressure roll 37 mounted on a shaft 40 which passes freely through the said plates 10 and 11, and is journaled in a pivoted journal bearing 38 adjustable by the screw means 39 to vary the pressure between the feed roll 36 and the pressure roll 37. A spur gear 41 (Fig. 8) fixed on the shaft 35 adjacent the spiral gear 33 has driving mesh with another spur gear 42 on the shaft 40. Thus the feed roll 36 and the pressure roll 37 are rotated together for the purpose of feeding cards therebetween.

Also journaled between the said plates 10 and 11, respectively, are skid roll shafts 43 (Figs. 4 and 8) carrying spiral gears 44 fast thereon and in mesh with spiral gears 45 carried on the shaft 26. Also fixed to said shafts 43, intermediate the plates 10 and 11 are pairs of spaced card skid rolls 46 for cooperation with similar pairs of rolls 47 used in advancing and holding cards, as will be hereinafter explained.

Inside the bracket 31 and fast on said shaft 26 is provided a spiral gear 50 adapted to mesh with and drive a spiral gear 51 fixed on one extremity of an eject roll shaft 52 journaled in said plates 10 and 11. An eject roll 53 carried on said shaft is adapted to cooperate with a pressure roll 54 fixed to a shaft 55 which passes freely through the plates 10 and 11, and is journaled in means similar to 38 and 39 of Fig. 2A for permitting adjustment of pressure between the roll 54 on shaft 55 and the eject roll 53 on shaft 52. Also, in order to effect counter-directional rotation between the eject roll 53 and the pressure roll 54, a spur gear 56 on shaft 52 adjacent gear 51 meshes with a spur gear 57 on the shaft 55.

Figure 2A:
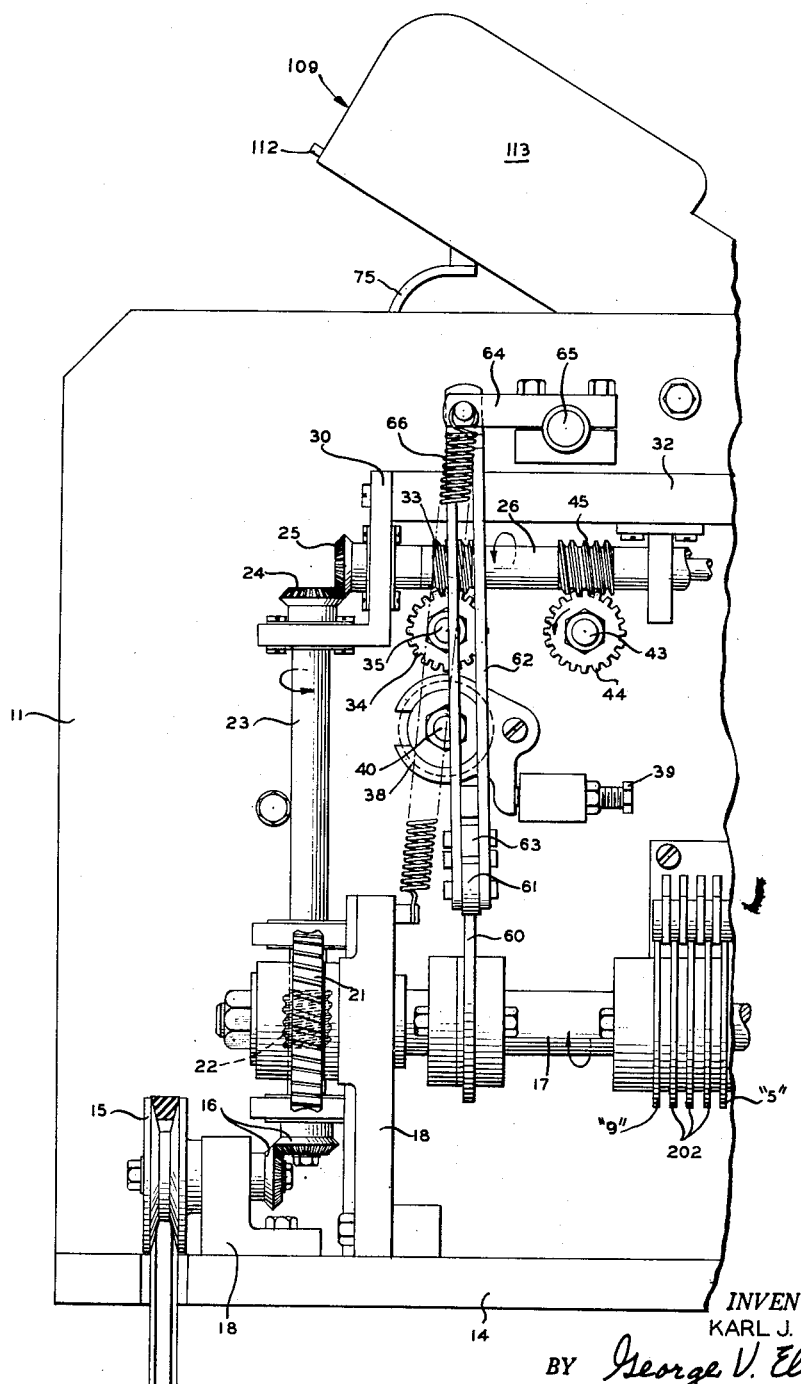
Fig. 2A is a fragmentary view in elevation substantially on the line 2A—2A of Fig. 1 showing the driving means.

With reference to Figs. 1 and 2A it will be seen that a card feed cam 60 is keyed to the countershaft 17 and has riding on its periphery a cam roller 61, carried between paralleled links which form a push rod 62. A short link 63 having one end pivotally connected to said push rod 62 just above the roller 61 is pivoted at its other end to a suitable bracket mounted on plate 11. The link 63 maintains the movable push rod 62 in vertical position. At its upper end the push rod 62 is pivotally connected to a lever 64 adjustably held fast on the extremity of a rock shaft 65 journaled between the plates 10 and 11. A tension spring 66 connected to the push rod 62 serves to urge the shaft 65 counterclockwise and resiliently maintain said roller 61 against the cam 60.

As illustrated in Fig. 4 downwardly extending arms 67 are adjustably secured to the rock shaft 65 at opposite sides of the housing and inwardly of the plates 10 and 11. Said arms 67 are pivotally connected to substantially horizontal links 70, which are connected in like manner to vertical links 71 arranged to swing on studs 72 projecting outwardly from the side walls 73 of a card magazine 74. Said magazine is formed by the aforementioned plate 13, the side walls 73, and a plate 75 having a cut out 76 therein for accommodating the passage of cards.

Secured pivotally, as at 77, to the lower ends of the links 71 are angle pieces 80 which are adapted to extend inwardly as at 84. Fastened between said angle pieces is a horizontal plate 81, having a picker knife 82 adjustably and suitably fastened thereto. The walls 73 are provided with elongated horizontal slots 83, through which pass said plate 81.

The plate 75 (Fig. 4) is provided with an upper aperture 85 for a roller 86 which is rotatably mounted in a bracket 87 fixed to the inner surface of the plate 75, the roller being also slidably movable in vertical direction. A pair of spring loaded plungers 90, also fitted in the bracket 87, engage the roller 86 and tend to urge it upwardly. A throat member 91 is secured to the roller 86 and, in consequence of coaction between the said plungers 90 and a flattened portion on the periphery of said roller, the member 91 may be maintained in either the vertical lowered position of Fig. 4 or in a raised horizontal position. A setscrew 92 in a stationary nut also affixed to the plate 75, on the inner surface thereof, is adapted for manual adjustment to provide clearance between the throat member 91 and an anvil 93.

Upon rotation of the drive shaft 17 the cam 60 reciprocates the push rod 62, to rock the shaft 65. Through the arms 67, the links 70 and 71 and the angle pieces 80, the shaft 65 reciprocates the plate 81, and the picker knife 82 engages the rear edge of the lowermost card of a stack of cards placed in the magazine 74 and feeds it through the throat member 91 and to the rolls 36 and 37 from which it passes to the sensing chamber, and the skid rolls 46, 47. Upon being fed from the sensing chamber the card passes between the eject roll 53 and its related pressure roll 54 to be passed into a card stacking means, the description of which follows.

At the left side of the machine and loose on a stud 94 (Figs. 1, 3, and 4) in the plate 10 is a spur gear 95 which meshes with a pinion 96 fast on one of the skid roll shafts 43. Also loose on the stud 94 but secured to the gear 95 is a pinion 97 which meshes with a gear 100 fast on the end of a shaft 101 journaled in the plates 10 and 11. The train of gears rotates the shaft 101 at half the velocity of rotation of the skid roll shaft 43, the purpose for which will be seen hereinafter.

As seen in Figs. 3 and 4, a pair of spaced card feed wheels 102 fixed on shaft 101, have formed in the peripheries thereof diametrically opposite chordal slots 103, in which are secured grippers 104 whose free end portions resiliently engage said wheel peripheries. Each wheel is also formed with a counterbore 105 and a pair of opposed radial bores 106 which open into the counterbore and are in register with the free end portions of said grippers. The bores 106 carry plungers 107 which are rounded at their ends and are adapted to engage the underside of the free ends of said grippers 104. Fitting loosely around the shaft 101, and having its extremities fitted in the wheel bores 105, is a sleeve 110 which is bored at its ends for receiving rollers 111. The bores in the sleeve 110 (Fig. 4) intersect the periphery of said sleeve, so as to permit peripheral portions of the rollers 111 to extend therebeyond. The sleeve 110 is made stationary by being secured to the lower end of an inclined plate 112 having side walls 113 fixed thereto for forming a card hopper or magazine 109 and having cut outs 114 for permitting it to straddle the said wheels 102.

A card holder 115, having a pair of small rollers 116 mounted on each of its sides and a center guide piece 117 adapted for riding in a slot 120 in the inclined plate 112, is provided for maintaining cards in a properly stacked manner in said hopper. A retainer piece 121 is further provided and is secured to the center piece 117 beneath the aforementioned plate 112. With this arrangement the card holder 115 is slidable on the plate 112 in a straight line, and due to the inclination of said plate is gravity urged toward the wheels 102.

A card deflecting plate 122 is secured to the wall 12 and has a cut out 123 in the arcuate portion with which is associated the eject rolls 53 and 54. A pair of slots 124 is also provided in the upper portion of the plate through which pass the grippers of the card feed wheels.

As pointed out above, the shaft 101 and, therefore, the wheels 102 are rotated at one half the speed of the eject and skid rolls 53 and 46, respectively, and the sleeve 110 having the rollers 111 fitted therein is secured to the inclined plate 112. Therefore, it will be obvious that for each revolution of the skid and eject roll shafts the wheels 102 will turn half a revolution, causing one of the pair of plungers in each of said wheels to engage its related roller 111 in the stationary sleeve 110, and be thereby projected radially to momentarily raise its related gripper 104 from the peripheral surface of the wheel. The timing of this action is such that it is effected when the grippers 104 are at the slots 124 in the plate 122. It will be seen that the travel of a card leaving the rolls 53, 54 is influenced by the curvature of the plate 122 and the leading edge of the card passes between the grippers 104 and the wheels 102. Immediately thereafter the plungers 107 disengage the rollers 111, and the spring tension of the grippers 104 causes them to grip the card and hold it firmly to the wheels 102. Further rotation of the wheels effects disengagement of the grippers 104 and engagement of the card with the inclined plate 112 which, as previously mentioned, straddles said wheels. Release of the grippers leaves the card in a stacked position in the hopper in front of the above described card holder 115. Emergence of a second card from between the rolls 53 and 54 is coincidental with the second half of the first revolution of the wheels 102 and the operation of the second set of grippers 104, which thereafter carry said second card to the hopper. It will be obvious that all cards conveyed by the rollers will be stacked in the manner just described and the weight of the holder 115 will maintain said cards perpendicular to the inclined plate 112.

*Sensing section*

A sensing unit shown in Figs. 3 and 4 includes a pin box formed by vertical front and rear plates 126 and 127, respectively, and similarly arranged right and left side plates 130 and 131, respectively. Included in the construction of said pin box is a card sensing chamber 132 formed by horizontal and parallel spaced chamber plates 133 and 134 through which chamber the card is adapted to pass. The chamber plates 133 and 134 are each perforated to provide eighty columns of twelve rectangular apertures 135 in each column, the apertures of one plate being aligned with those of the other, and both being adapted to have pass therethrough the upper portions of sensing pins 136. The pins are guided by a similarly perforated plate 137 and are formed to provide steps 140 for a purpose to be described hereinafter. At their lower ends the pins 136 are arranged to engage the upper extremities of elements 141 which are mounted between upper and lower plates 142 and 143, respectively, and are resiliently urged upwardly by coil springs 144, carried thereon and positioned between shoulders 145, extending from the opposite sides of said elements and the upper surface of the said lower plate 143.

Each column of sensing pins is provided with a related horizontal locking slide 146 (Figs. 4 and 10), which slides are movably mounted for endwise movement in the pin box, through the medium of left and right abutment portions 150 and 151, respectively which are formed in the ends of said slides and protrude through apertures in the side plates 126 and 127.

Each of the sensing pins 136 is provided intermediate its extremities with a lateral projection or stud 152 adapted to cooperate with a cam nose 153 formed in a window 154 cut out of a related locking slide 146. All of the noses 153 are directed toward the right in Fig. 4 and all of the locking slides 146 are urged in that direction by spring loaded elements 155 carried between plates 156 and 157 secured at opposite sides of a bar 160 which is fixedly mounted to the left side of the pin box. It will be seen that each sensing pin 136 is adapted, when moved from an upper to a lower position, to effect a leftward actuation of its related locking slide 146, through the camming action of the stud 152 with the said cam nose 153 formed in the related locking slide. Any such leftward movement of the slide 146 will be against the urging of its related spring loaded element 155. Therefore, when the sensing pin is moved to its lower position and the stud passes over the nose 153, the spring loaded element 155 will snap the slide 146 to the right to latch the stud under the nose and thereby maintain said sensing pin in its lowered position until released by other means which will be described hereinafter.

A toggle mechanism, generally indicated by the numeral 159 (Fig. 3), includes rods 161 and 162, mounted between the pin box plates 126 and 127. Within the pin box and carried loosely on the rod 162, with suitable spacing therebetween, are twelve triangular shaped levers 163. Also within the pin box, but carried on the rod 161 with like spacing therebetween, are twelve bell crank levers 164, these levers 163 and 164 each having upper and lower points of connection with operating links 165, 166 and 167. The horizontal links 165 pivotally connect the lower points of both levers 163 and 164. The vertical links 166 and 167 pivotally connect the upper points of the levers 163 and 164 with the ends of restoring bars 170, which bars are each adapted to overlie and cooperate with the above mentioned steps 140 formed on the pins 136 of a particular row thereof. Formed off the free ends of the bell crank levers 164 are hooks 171 which are connected resiliently by a plurality of coil springs 172 with a comblike guide member 173 fixed to the plate 131. This arrangement biases the bellcrank levers clockwise in Fig. 3 and normally tends to maintain the bars 170, through said links 166 and 167, in their uppermost position above the steps 140 of the sensing pins 136. The member 173 extends downwardly and abuts the hooks 171 to limit the clockwise rotation of the bell cranks 163 and 164 and the rising movement of the restoring bars 170.

Fixed in the free arms of the levers 163 are studs 175, which are engaged by steps 176 formed in spatulate or triangular shaped levers 177 which are pivotally connected as at 180 to levers 181 each having a nose 182 formed thereon. The levers 181 each carry a roller 183 on the lower extremity thereof which rollers fit loosely in a channeled block 184 having a combplate 185 secured thereto and effective for both retaining said rollers in the block and maintaining proper lateral spacing between the levers 181.

Near the midsections of the levers 181 and connected thereto pivotally are short links 186 which are similarly connected to the lower ends of related vertical levers 187, the latter of which carry cam rollers 190 and are laterally spaced by the noses 182 formed on the levers 181. Also the levers 187 are carried loosely at their upper ends on a rod 191 which is mounted between arms 192 and 193 of a bracket 194 (Figs. 1 and 3). A rod 195, journaled in said arms, has fixed thereto outside of the bracket arm 192, a manual control lever 196 said rod also carrying, between said arms, U-shaped members 197 fixed to the rod and corresponding in number to and straddling the spatulate levers 177. The members 197 have forked arms 200 which cooperate with studs 201 extending from said levers 177.

It will be seen that, in the mechanism first described, an exertion of pressure on the rollers 190 will be transmitted to the vertical levers 187 which, through the short links 186, will effect straightening of the toggle formed by the levers 181 and the spatulate levers 177. This straightening action causes the levers 177 to pivot clockwise (Fig. 3) about the studs 201 to give an upward push on the studs 175 and thereby cause counterclockwise rotation of the bell cranks 163. This latter movement is transmitted by the links 165 to the bell cranks 164, and, through the vertical links 166 and 167, lowers the restoring bars 170 to engage the steps 140 in the pins 136 to depress the pins that are in raised position, against the tension of the springs 144.

It will be seen also that a manually controlled counterclockwise movement of the control lever 196 will be effective for rocking the rod 195 in the same direction to thereby effect, through the members 197 and the studs 201, a clockwise rotation of the levers 177 about the pivot point 180 for moving the steps 176 to an ineffective position with respect to the studs 175 carried on the bell cranks 163. The toggle mechanism 159 may be disabled for a purpose which will be hereinafter described.

The drive shaft 17 has keyed thereto a group of twelve restoring or impulse cams 202, each cam of which group is formed with a high portion for actuating one of the rollers 190 to effect restoration of the sensing pins in its related pin row, and in the manner above described. The cams 202 are designated from left to right in Fig. 1, to coincide with the horizontal rows of data index positions of a standard card as "12," "11," "0," "1," "2," "3," "4," "5," "6," "7," "8," and "9," and the profiles of said cams are such that the "12" cam is first effective and the others are effective seriatim to pull the restoring bars 170 down for pulsing action by the slides 146. The cams 202 are effective to simultaneously raise the bars 170 to release the sensing pins 136 for sensing engagement with the card simultaneously. Also carried loosely on the rods 161 and 162 (Figs. 3 and 10) and in the above described pin box are bell crank or triangular plate levers 203 and 204, respectively, having the pendant portions thereof connected by a horizontal link 205 and the upper portions thereof pivoted to vertical links 206 and 207. To this point these elements are identical to those provided for operating the restoring bars 170. However, secured to the upper ends of the links 206 and 207 are members 210, bent to provide ears 211, between which is secured a card gate 212.

Figures 10, 10A:
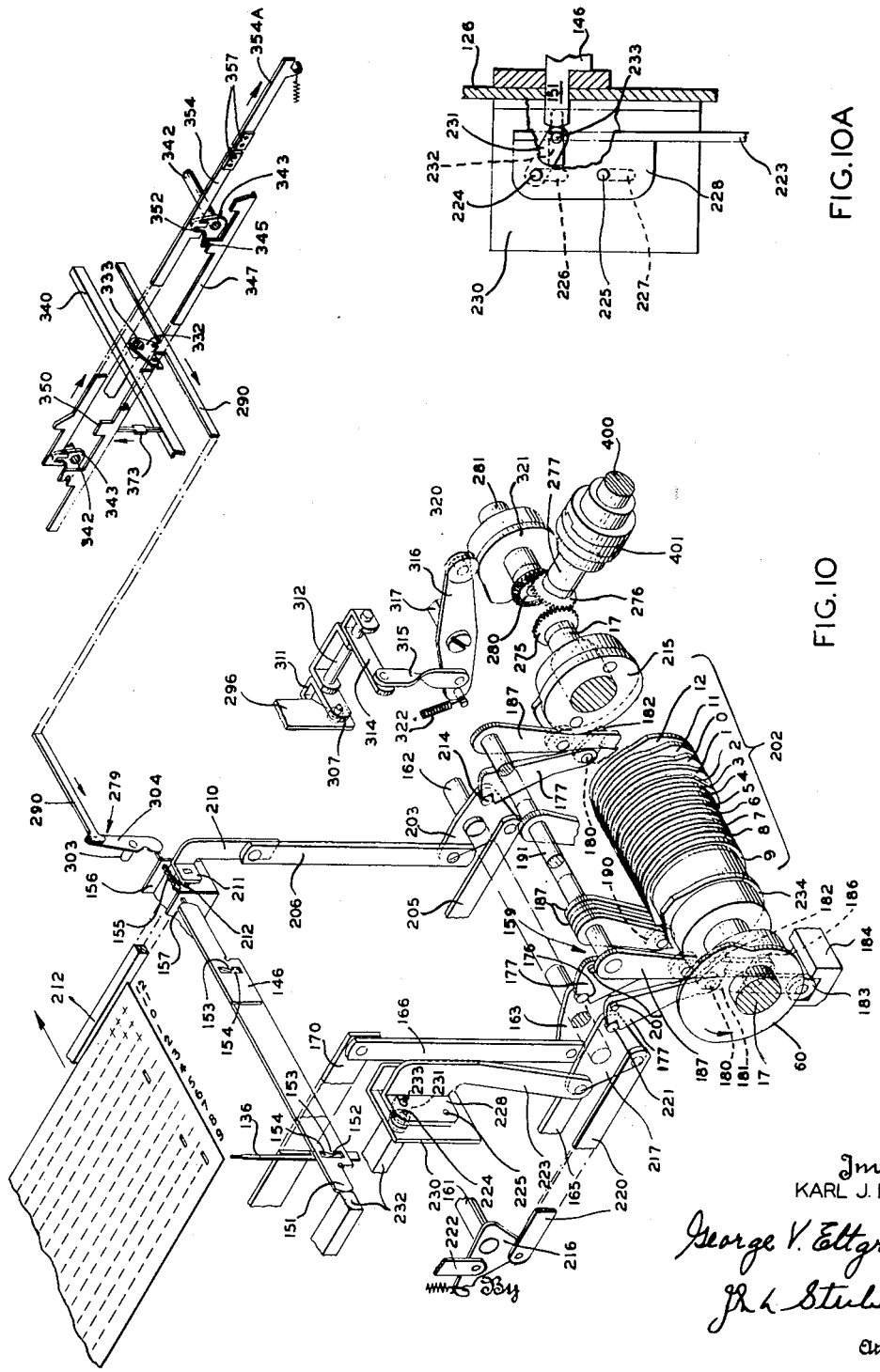
Fig. 10 is a view in perspective showing a part of the mechanism for sensing a card and conveying sensing impulses.
Fig. 10A is an enlarged fragmentary view of the retract bar mounting.

A spring similar to springs 172 connecting the bell crank 204 and the member 173 urges the bell cranks 203 and 204 clockwise in Figs. 3 and 10, and thus the card stop or gate 212 is normally held closed or in a raised position to detain a card in the card chamber. A stud 214 carried by the lever 203 is adapted to cooperate with a toggle arrangement identical to that provided for actuating the restoring bars 170, which arrangement is rendered effective through a card gate cam 215 located adjacent the "12" cam on the shaft 17. It will be seen that when the high portion of the cam 215 engages its associated roller and straightens the toggle, the card gate 212 will be lowered to permit egress of a card from the card chamber 132.

Also carried loosely on the rods 161 and 162, but on ends thereof extending outwardly from the plate 126, are bell crank levers 216 and 217, respectively, which bell cranks are provided with depending portions connected by a horizontal link 220 (Figs. 4 and 10). A stud 221 fixed in the bell crank 217 is adapted to cooperate with a toggle mechanism identical to that described with respect to the pin restoring bar mechanisms 177, 187, etc. Pivotally connected to the forwardly extending arms of the bell crank levers 216 and 217 are vertically extending members 222 and 223, respectively, which members are provided with bent over portions 228 (Fig. 10A). In each portion is fixed inwardly extending studs 224 and 225 adapted to slide in vertical slots 226 and 227, respectively, formed in spaced brackets 230 fixed to the front pin box plate 126. Carried loosely on each stud 224 just outwardly of its respective bracket 230 is a short link 231 carrying a rectangular slide release bar 232, the opposite ends of which bar have a pin-in-a-slot connection as at 233 with the brackets 230.

When the levers 216 and 217 pull the members 222 and 223 down under action of the release cam 234, the links 231 tend to assume a horizontal position and in so doing push the release bar 232 against the abutment ends 151 of the slides 146 to move them against the tension of their related resilient elements 155. When the release cam 234 is ineffective a tension spring similar to the springs 173, connecting the bell crank 216 with the comb member 172 causes the vertical members 222 and 223 to be maintained in their normal raised or inoperative positions, which in turn causes the bar 232 to move away from the locking slides 146 to permit said slides to be returned to and held in their normal positions under the influence of the resilient elements 155. This release movement of the slides 146 removes the noses 153 from the paths of the studs 152 of the sensing pins 136 and permits those pins which may not be otherwise obstructed to rise under the influence of their associated springs 144.

The pin box is removable, as a whole, from the machine after the toggle mechanism 159 is disabled as above set forth, in order to permit repairs to be made to the sensing unit or to clear up card jams which may occur therein. Secured to each of the right and left side plates 130 and 131, respectively, is an angle member 236 having an outwardly extending leg in which is provided round holes 237, and mounted on the inner sides of both plates 10 and 11 is a pair of spaced blocks 240 having secured therein downwardly extending tapered pins 241. The upper portions of said pins fit snugly in the holes 237 in the angle members 236 when the unit is in the effective raised position seen in Fig. 3. To remove the unit from the machine it must be lowered an amount sufficient to let the pins 241 clear said holes 237.

In order to raise and lower the unit into and out of its effective position, and to maintain it in said effective position, there are provided angle pieces 242 having legs extending inwardly and adapted to engage the undersides of said angle members 236. The angle pieces 242 are each secured to the cross bars 243 of yokes 244, each formed to have a pair of legs 245, adapted to fit slidably in a pair of guide blocks 246 mounted in spaced arrangement on each of side plates 10 and 11. Provided on each cross bar 243 is an upwardly extending and centralized portion 247 by which said yoke member 244 is pivotally connected to the lower end of a substantially S-shaped link 250. The upper ends of said links 250, see Fig. 4, are connected pivotally as at 251 in levers 252 adjustably held fast on a shaft 253, which shaft is journaled in bushings 254 in said plates 10 and 11. One outer end of the shaft may be squared as at 255 for receiving a turning handle through which said shaft 253 may be turned through limited distances clockwise and counterclockwise.

When the shaft 253 is rocked to its most counterclockwise position (Figs. 3 and 4) links 250, yoke members 244, and the angle pieces 242 are lowered, and consequently the sensing unit, supported by the inwardly extending legs of said angle pieces 242, is lowered. In their lowered position the angle members 236 secured to the sensing unit are below the ends of the tapered pins 241 and, therefore, the unit is readily removable from the machine through an aperture provided in the side plate 13. In replacing the unit the holes 237 are aligned with the pins 241 and the shaft 253 is rocked clockwise. This action, which is the reverse of the just described lowering action, causes the sensing unit to be raised to its operative position, and, due to the position of the pivot 251 to the right of the center of said shaft 253, the weight of the unit is employed for maintaining the latter in a raised and operative position.

It will be seen that with the sensing unit raised to its normal operating position, the card sensing chamber 132 formed by the aforementioned perforated plates 133 and 134 will be disposed in the path of card travel, and the lever 196, which had been previously swung counterclockwise to disable the toggle mechanism 159 may be reset in clockwise direction to enable said mechanism and thereby render the sensing unit again operable.

The aforementioned skid rolls 46 are adapted to rotate constantly, and with their cooperating resilient rolls 47 are effective for conveying a card and pushing the forward edge thereof against the closed card gate 212, to thereby align the rows of card index positions with the rows of sensing pins 136.

Means denoted generally by numeral 249 have also been provided to properly align the columns of card index positions with the columns of said sensing pins (Figs. 3, 4, and 8). Brackets 256 are secured to the inner sides of the plates 10 and 11, and each bracket has an aperture for passage therethrough of one of the above described S-links 250. Said brackets 256 each have pivotally mounted thereon a pair of bell cranks 261, the upright arms of which are interconnected by springs 262. The other arms of said bell cranks 261 are bail like, and carry on the innermost portions thereof the previously mentioned rolls 47. The springs 262 tend to effect counter directional rotation of the bell cranks 261 to maintain the rolls 47 in engagement and resilient cooperation with the skid rolls 46. It will be seen that as long as the skid rolls 46 are driven and as long as the rolls 47 cooperate therewith, said skid rolls will be operative for conveying a card.

Rollers 263, carried on the bail like arms of the bell cranks 261 are adapted to cooperate with cam surfaces 264 formed in the lower ends of arms 265, which arms in their dependent portions are offset in order not to interfere with the skid roll shafts 43. The upper ends of the arms 265 are bail shaped and are adjustably mounted on rods 266 journaled at their extremities in brackets 267 fixed to the plates 10 and 11. Downwardly extending aligning fingers 270 formed with bail like upper ends are also adjustably held fast on the rods 266. Also adjustably secured on the rods 266, but just inward of the right side extremities, are bail like outwardly extending arms 271 having downwardly extending ears carrying rollers 272, adapted to cooperate with cams 273 fixed to the shaft 101 and each cam 273 having a pair of diametrically located lobes 274.

With the previous reference to the shaft 101 in mind, it will be understood that during each revolution of the said transport and skid rolls, one of the lobes 274 on each of the cams 273 (Fig. 3) will effectively cooperate with a related one of the rollers 272 on the arms 271, to thereby rock the rods 266 counter directionally. The rocking of said rods 266 effects camming of the rollers 263 by the surfaces 264 on the arms 265 and thus effects rotation of the bell cranks 261 against tension of the springs 262, to thereby move the rolls 47 out of cooperative engagement with the skid rolls 46 and thereby momentarily free the card from the feeding action thereof. Also rocking of the rods 266, in the manner just described, effects momentary movement of the aligning fingers 270 toward the center of the card chamber 132. Therefore, it will be understood that while the pressure of the resilient rolls 47 is relieved and the card is free, the aligning fingers 270 are effective for engaging the card on either side thereof and centering it in the chamber, thereby aligning the index position columns with those of the sensing pins.

Transposing section

The pattern of the holes in the card to be sensed can be reproduced as a transposed matrix, in the card to be punched, by interchanging the columns in which the holes of the sensed card are arranged, through a transposing mechanism which consists of the perforated tray above mentioned. The tray accommodates pins for vertical movement between the lift bars of an interchange or transposing mechanism which includes shift rod means for controlling the action of a punching mechanism. Sensing of the whole original card is done simultaneously and the hole detecting means are then pulled down in row by row succession to provide the pulsing action which carries out the punching of the card, being punched, in row by row order. The transposing section is in effect a selectively settable means whereby the alphabetical and numerical data sensed in any field of a record card can be punched in any selected field of another card.

As will be seen in Fig. 1 the casting 20 is formed with two side walls, and a connecting wall and the drive shaft 17, in addition to being journaled in the one side wall thereof, extends into the casting and has secured on its end a bevel gear 275. Meshing with the bevel gear 275 is a second bevel gear 276 fixed to the end of a short clutch shaft 277 journaled in the rear wall of the casting, the purpose of which will be seen hereinafter. A third bevel gear 280 on shaft 281 meshes with the second bevel gear 276 on shaft 277 which is journaled in one wall of the casting 20 and in a bracket 282 secured to the base plate 14.

The transposing section (Figs. 1, 2, 5, 6, and 10) is located adjacent the sensing section from which it is operated through a disabling mechanism 279 and includes side plates 283 and 284, the latter being adjacent the plate 12 of the sensing section (Fig. 4). Disposed between the plates 12 and 284 is a vertical bar 285 (Fig. 5) fixedly mounted between plate brackets 286, which pass through an enlarged aperture 288 in the plate 12 and are secured to the plate at the side edges of said aperture. To the upper edge of said bar 285 is secured an inverted U-shaped comb member 287 adapted for receiving and suitably spacing the right hand ends of a plurality of lower slide bars 290 which pass through an aperture in the plate 284 and correspond in number and alignment with the aforesaid sensing slides 146. A wire like rod 291 is provided within said comb member 287, between the bars 290 and the bar 285, to serve as a bearing and facilitate the movement of said slide bars 290.

Each of the aforementioned plate brackets 286 (Figs. 4 and 5) has upper and lower horizontal slots 292 adapted for receiving the stud like ends 293 of a pair of square rods 294, which rods are connected by a vertical plate 295. Actuators 296, having vertical slots 297 for receiving studs 300 protruding from the exterior faces of the bracket plates 286, are mounted for vertical sliding movement with respect to said brackets 286. These actuators are each provided with a pair of diagonal slots 301 which also receive the stud like ends 293 of the rods 294. Affixed to opposite ends of the upper square rod 294 and just inwardly of the bracket plates 286 are other brackets 302, between which is mounted a pivot rod 303 adapted to carry loosely a plurality of levers 304, corresponding in number to the above mentioned sensing slides 146 and suitably spaced apart by a comb member 305 secured to the rod 294. The lower tail portions of said levers 304 are adapted to be engaged by the above mentioned resilient elements 155 of the sensing section (Fig. 4), while the upper arms of said levers are pivotally connected as at 306 to the right hand ends of the lower slide bars 290 (Fig. 5).

Formed in the lower ends of the members 296 (Figs. 5 and 10) are hooks 307 adapted for receiving and cooperating with studs 310 fixed in arms 311, adjustably fixed on a rock shaft 312 journaled in the ends of a U-shaped bracket 313 which is secured to the above mentioned plate 284. At one end of said shaft 312 and adjustably held fast thereon is another arm 314 which is pivotally connected by means of a link 315 with the arm of a cam roller lever 316 which is pivotally mounted as at 317 on the said wall 284. Carried on the free end of the lever 316 is a roller 320 adapted to coact with a disabling cam 321 on the shaft 281. The roller is urged into contact with the cam by a spring 322 which connects an arm of said lever 316 with a suitable stud in the plate 284.

As described above, each sensing pin locking slide 146 is adapted to be moved to the left in Fig. 4 upon retraction or depression of any sensing pin 136 which had sensed a perforation in a card. Normally, the levers 316 are operatively positioned, as seen in Figs. 5 and 10 and any movement of the slides 146 is transmitted, through the related elements 155, to the corresponding vertical levers 304 for effectively rotating the same clockwise in Fig. 5 on the rod 303 thereby pulling the slide bars 290 to the right in Fig. 5, to transmit the sensed data to the transposing section. As also described above, the release bar or bail 232 (Fig. 10) when actuated, moves all of the slides 146 simultaneously to release the sensing pins 136 for initial sensing action. In order to avoid transmission of this pin releasing motion to the transposing section, use of made of the disabling mechanism 279. The high portion of the disabling cam 321, in proper timed relation with the actuation of said release bail 232, actuates the lever 316 and through the link 315 and arm 314, causes the shaft 312 to rock clockwise in Fig. 5. This in turn causes the studs 310 to pull the hooks 307 down, so that the diagonal slots 301 in the actuators 296 cam the rod ends 293 to move the rods 294 and their connecting plate 295 to the left in Fig. 5. This causes the bottom ends of all of the levers 304 to be moved to the left so that their tail ends are moved to an inoperative or disabled position beyond the reach of the ends of the related elements 155, shown in Fig. 4. Thus, the movement of the slides 146 effected by operation of the release bail 232 is prevented from being transmitted to the lower slide bars 290. It will be seen that when the roller 320 is riding on the low dwell of the cam 321 the levers 304 will be maintained in effective position with respect to the elements 155 for transmitting data representing pulsing actions of the slides 146 from said elements 155 to the slide bars 290.

Figure 5:
Fig. 5 is a vertical section taken on the line 5—5 of Fig. 1 showing impulse transfer means and combines with Fig. 4 to show how the transfer means is actuated.

Extending between the plates 283 and 284 of the transposing section is a pair of lower transverse bars 323 and a pair of upper transverse bars 324 (Figs. 5 and 6). Secured between the lower bars 323 is a pair of spaced parallel bars 325, to the undersides of which are secured retaining bars 326, which are spaced from said bars 325 for supporting the lower slide bars 290 for longitudinal movement. Combs 327, attached to the bars 325, are provided for laterally spacing the slide bars 290, which are formed with upwardly extending slotted lugs 330. The lugs 330 of each slide bar embrace extrusions 331 in the pendant arms of a related pair of bell cranks 332 carried loosely on pivot rods 333 mounted between brackets 334 secured to the said bars 325. The bell cranks 332 are maintained in spaced relation by comb members 335 secured to the bars 325, and are also provided in laterally extending arms thereof with other extrusions 336 which engage slotted lugs 337 depending from the underside of a plurality of parallel lower lift bars 340. The lift bars, one for each slide bar 290, are of inverted L-shape in cross section to provide a top flange and they normally rest across the tops of said bars 325 and may be guided in vertical movement in said comb strips 327.

It will be seen that a rightward linear movement in Fig. 5 of any one of the lower slide bars 290 will cause a counterclockwise rotation of its related pair of bell cranks 332, which, in turn, will effect the raising of its related lower lift bar 340.

Mounted between brackets 341 (Figs. 5, 6, and 10) secured to each of the upper transverse bars 324 are pivot rods 342 upon each of which are loosely carried a plurality of bell cranks 343 suitably spaced in the slots of comb members 344. The horizontally extending arms of said bell cranks 343 are provided with lateral extrusions 345 adapted to be embraced by upwardly extending slotted lugs 346 formed in upper lift bars 347 of L-shape in cross-section, which bars 347 are arranged to be spaced from, and to extend at right angles to, the aforementioned plurality of inverted L-shaped lower lift bars 340. Other upwardly extending lugs 350 formed in the upper lift bars 347 are adapted to engage the slots of comb members 351 fixed to the bars 324 for maintaining a suitable spacing between said bars 347.

The upwardly extending arms of the bell cranks 343 carry extrusions 352 for engagment with slots in downwardly extending lugs 353 formed in the lower edge of a plurality of upper slide bars 354, which rest across the transverse bars 324 and are restricted to linear movement by retaining bars 355 mounted in spaced relation above said bars 324. As also seen in Fig. 6 the movement of said slides 354 in one direction is limited by upwardly extending lugs 356 adapted to abut one of the retaining bars 355, and the opposite ends of said upper slide bars 354 and their punch extensions 354A are thickened by the addition of secondary pieces 357 fixed so that when the separable punch and transposing sections are attached together the pieces 357 will substantially abut. A vertical movement of any one of the upper lift bars 347 will cause a clockwise rotation of its related bell cranks 343 which, in turn, will cause a linear movement of its related upper slide bars 354 and its extension 354A.

In the space between the lower lift bars 340 and the upper lift bars 347 (Figs. 1, 5, and 6) is a transposing pin unit 348 which is of substantially rectangular drawer construction and includes end walls 360 and 361 and side walls 362 and 363, to the latter two of which are secured rails 364 which are slidable in channels 365 formed in support strips 366 secured to the above mentioned side plates 283 and 284. Thus the unit is slidable into and out of position beween the upper and lower lift bars as seen in Fig. 5.

Figure 14:
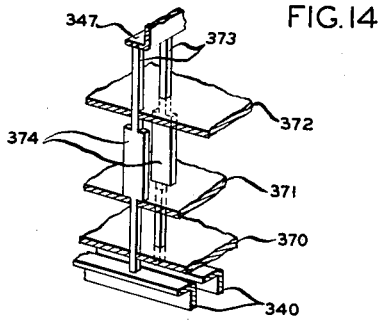
Fig. 14 is an enlarged fragmentary view in perspective showing the mounting of the motion transfer pins in the trays.

Within the drawer structure of the transposing unit 348 are carried lower, intermediate and upper pin trays 370, 371 and 372, respectively (Figs. 5, 6, and 14) all of which are plurally perforated. The lower tray 370 and the intermediate tray 371 are suitably fixed in the unit in parallel spaced superposed arrangement, and the perforations in the lower and intermediate trays correspond in number and align axially with each other and with those in the upper tray 372.

Movement transfer pins 373 having the lower ends thereof removably inserted in the aligned perforations of the lower and intermediate trays 370 and 371, respectively, are formed with centrally enlarged body portions 374 presenting upper and lower shoulders, the latter for supporting the pins in said intermediate tray in the manner seen in Fig. 5, so that when the upper tray is in position the upper ends of the pins 373 project through the perforations in said upper tray with the upper shoulders of the pins spaced therefrom, to provide a limiting means to rising movement of said pins. The pin holes in the trays are disposed at the points of intersection of the upper and lower lift bars 347 and 340, respectively.

Suitable latching handle means 375 in opposite sides of the upper tray engage the side walls 362, 363 to detachably secure the tray in position in the unit drawer. When the upper tray is removed, the translator pins may be selectively and spatially arranged in the holes of the unit for transferring the movement of any one or more of the lower lift bars 340 to any one or more of the upper lift bars 347, and when the tray is replaced this arrangement or pin pattern is accurately maintained.

It will be seen that the unit permits the elevation of a lower lift bar 340, as effected by an actuation of its related lower slide bar 290, to effect the elevation of one or more of the upper bars 347 for actuating the related upper slide bars 354.

Each lower lift bar 340 and its subjacent slide bar 290 form a unit. Each unit is aligned with a locking slide 146 and corresponds with the vertical column of a card being sensed. In like manner, each upper slide bar 354 and its subjacent lift bar 347 form a unit which is aligned with a single punching member and corresponds with the vertical column of a card being punched. The units extend at right angles to each other and, in the use of an eighty column card, have sixty four hundred points of intersection with which the holes in the trays correspond. In this manner holes sensed in any column of a card can be punched in any selected column of the card to be produced by selectively placing the movement transfer pins in the proper positions in the tray, so that they may transfer a pulse movement from the unit corresponding to column 58 for instance, of the card being sensed, to the unit corresponding to column 26, of the card being punched. The operation of the slides 146 takes place through horizontal row by row operation of bars 170 and the operation of the punches takes place in like manner by the row by row movement of the card, so that any code representation of data employing one or more holes in a column can be transposed as desired.

While rectangular holes have been illustrated to bring out one of the objects of the invention it is evident that round holes can be used as well, and that cards having any number of vertical columns can be accommodated. The term "row" herein means the horizontal or lengthwise row of the card, of which there are twelve corresponding to the data index positions in each column extending widthwise or across the short dimension of the card.

*Punching section*

As best seen in Figs. 6 and 7, the punching section 379 is located in the left hand rear portion of the machine and is supported between vertical side plates 380 and 381, respectively, secured to a base plate 382.

Carried fixedly on a rod 383 journaled between the side plates 380 and 381 and just inside of each of said plates is an upper latch arm 384, connected pivotally by a link 385 to a lower latch arm 386 loose on a stud 387 fixed in its respective side plate. A spring 390 resiliently connecting each arm 386 to its related side plate urges both arms 386 and 384 downwardly. Rollers 391, carried on the extremities of the arms 384 and 386, are adapted to cooperate with hooks 392 fixed to the inner surfaces of the side plates 283 and 284 of the translating section. It will be seen that when the punching and translating sections are brought together for attachment, the rollers 391 will first ride over camming portions 393 formed on the hooks 392, and will then be snapped down by the springs 390 to latch the parts together.

In order to disconnect the sections, the outer end of an upper link stud 394 which extends through an arcuate slot 395 in the side plate 380 may be provided with a suitable knurled head, and when the stud is lifted the rollers 391 are disengaged from the hooks 392 to permit detachment of the punching and translating sections.

A drive shaft 400 (see Figs. 1 and 2) journaled in brackets 396 and 397 secured to the base plate 382 is connected axially to the aforementioned short shaft 277 by a suitable coupling 401 (Figs. 1, 2, 9 and 10) and carries a worm 402 in driving mesh with a worm wheel 403 carried on a suitably journaled vertical shaft 404, at the upper end of which is secured a bevel gear 405. A bevel gear 406, driven by said gear 405 is carried on the end of a horizontal shaft 407 to which is fixed a helical gear 410 for driving a helical gear 411 fast on one end of a roll shaft 412 which is journaled in the side plates 380 and 381. The shaft 412 carries a transport roll 413 cooperating with a pressure roll 414 carried on a shaft 415 which latter passes freely through the right and left side plates, and may be journaled in adjustable bearing means similar to the ones 38 and 39 illustrated in Fig. 2A for varying the contacts pressure between the rolls 413 and 414. A spur gear 416 fast on the transport roll shaft 412 adjacent the worm gear 411 is provided for driving a spur gear 417 on the shaft 415, so that the transport roll 413 and the pressure roll 414 are rotated in unison to feed the cards to be punched.

Also journaled between the side plates 380, 381 are three skid roll shafts 420, which shafts are each provided with helical gears 421 at one end for meshing engagement with helical gears 422 fixed to the shaft 407. Also fast on each shaft 420 (Fig. 7) is a pair of spaced skid rolls 423 which coact with lower skid rolls 424 mounted for free rotation in spring urged bell cranks 428 to provide yieldable engagement between the skid rolls 423 and 424 so that a card fed thereby is maintained against a stop, as will be later explained.

The shaft 407 near one extremity carries a spiral gear 425 which has driving mesh with a spiral gear 426 fast on the end of an eject roll shaft 427 which carries an eject roll 430 adapted to coact with a pressure roll 431 carried on a shaft 432 which passes freely through the side plates, and may be journaled in means such as 38, 39 (Fig. 2A) permitting adjustment of pressure between the eject roll 430 and the pressure roll 431. The shaft 432 is driven through meshing spur gears 433 and 434 on the shafts 427 and 432, respectively, for rotating the eject rolls 430 and 431 to feed cards that have passed through the punching stage to an eject magazine 436 (Fig. 6) supported on suitable cross bars 437 extending between the side plates of the machine.

In this punch section there is provided a card supply magazine 438 and a card feeding picker mechanism 439 (Figs. 2 and 7) substantially similar in structure and operation to that shown in Figs. 2A and 4 and operable from a cam 435 on the drive shaft 400 through a vertical cam rod 440 pivoted to a horizontal lever 441 clamped to a rock shaft 442 which is journaled in the walls 380 and 381. The rock shaft carries a pair of clamp arms 443 for actuating the picker mechanism 439, through the links 444 and 445, to feed one card at a time out of the magazine 438 to the feed rolls 413, 414.

The punching of the data index perforations in cards, fed from the magazine 438 by operation of cam 435, is performed by a punch mechanism indicated generally as at 379. The card to be punched is advanced to and held against stops, which are raised in succession as will be later explained, so that a single row of punches coacting with a single row of openings in a die plate can perforate the card in any columnar position in row by row operation. The punch mechanism, mounted between the side plates 380 and 381 on a frame composed of suitable cross bars and strips, includes a shaft 448 (Figs. 7 and 9), driven from the middle skid roll shaft 420 through a three unit gear train 449. The shaft 448 has a longitudinally fluted section 450 to provide driving means for punch actuators 451 arranged in adjacent relation, so that the actuators and their associated punches align with the columns of data index positions of the card.

Each of the actuators 451 (Figs. 7, 11, 12, and 13) includes a punch ring 452, having inside teeth 453 and an undulate periphery 454, adapted to ride over a roller 455 carried on a detent punch arm 456, which is pivoted as at 457 to a frame part and urged toward the punch ring by one or more springs 458. The ring 452 is arranged for rotation about the hub 459 of a pinion ring 460 in an interrupted portion 461 of which hub 459 is pivoted a pinion 462 whose teeth mesh with the inside teeth 453 of the punch ring and the flutes 450 of the shaft 448. The pinion ring 460 is peripherally notched as at 463 and the number of notches which form ratchet teeth, is such that the vertical face of the notch that is uppermost at any time will coincide with the median line of the lowermost hollow of the alternate hollow and crest forming undulations of the periphery of said ring 452 and with the center of the detent roller 455.

Each upper slide bar extension 354A carries a roller 464 (Figs. 7 and 11) for engagement with an obliquely disposed end 466 of a detent pawl level 467 suitably pivoted in the frame and urged by one or more springs 468, so that its depending tooth or projection 469 is kept out of contact with the notches or teeth of the pinion ring. A momentary or pulse action of the slide bar 354 toward the right will rock the pawl level 467 to cause projection 469 to arrest the rotary motion of the pinion ring 460. Each detent arm 456 has a bearing area 470 which fits snugly into a seat 471 of a punch bar or gag 472 supported for vertical movement in a punch block 473, the openings in the latter of which register with the openings in a die block 474. The card to be punched passes between the blocks 473 and 474. The shaft 448 has a constant clockwise rotation, and as the punch disk 452 is held from rotating by the roller 455, the pinion 462 will travel in its orbit, clockwise, and because it is mounted for rotation on the hub of the pinion ring 460 it will also rotate the latter clockwise. Upon a pulse action of bar 354A the movement of the pinion ring and the pinion will be arrested by the projection 469 of the pawl lever 467 and the turning force of shaft 448 will rotate the pinion to turn the punch ring 452 counterclockwise one serration increment, against the yieldable resistance of the roller 455, to depress the arm 456 and actuate the associated punch.

This pulsing action of the bars 354, which is instantaneous, will operate any punch in the row. The cards are each fed from the magazine 438, so that the top edge, thereof abutting the "12" stop first, will position the top row "12" of data index positions beneath the row of punches 472, which are spaced laterally to correspond with the vertical columns of data index positions of the card. The pulsing action of the bars 354 results from the successive lowering movements of the restoring bars 170 in drawing down the pins 136, that have sensed perforations in the entire card, in row by row sequence beginning with row "12" to move the locking slides, corresponding to any column of the card in which a perforation in the "12" row is sensed, so that the corresponding bars 354 will have a pulsing action. The position of the pins 373 will determine in what columns, of the card to be punched, the perforations will be made as the card successively abuts the punch stops 475 designated "12" to "9" (Figs. 7 and 11) for row by row punching.

The punching stop mechanism includes a top plate 476 bounded by side strips 477 forming suitable grooves at opposite edges thereof through which the card is fed across the plate by the skid rolls 423, 424 to successively abut spaced stop lips 478 formed along the upper edges of the stops 475 and adapted to be projected above the surface of said plate 476 in sequence. The stops each have a depending tail portion 479 pivotally supported in the free end of a cam lever 480 whose opposite end carries a roller 481 maintained in engagement with a stop cam 482 by a spring 483 connecting the lever 480 with a part of the frame. Twelve of these stop cams 482 are fixed to shaft 400 and the camming action thereof is synchronized with the operation of the sensing or impulse cams 202, i. e., stop "12" is raised by its cam 482 designated "12" in proper timed relation with the impulse produced in the upper slide bars by operation of the locking slide 146 by the restoring or impulse bar 170 under influence of the impulse cam 202 designated "12." Hence, the card to be punched abuts the stops "12," "11," "0," etc., successively, and perforations are punched therein row by row in accordance with the perforations in any field or zone of the sensed card and corresponding to the positions of the transfer pins 373.

As shown in Figure 15, which shows a modified form of the foregoing invention, the locking slides 146 acting through the interponent pins 155 and the levers 304 may directly actuate short bars 485, similar to the bars 290, each of which carries a roller 486 for camming engagement with the inclined edge 466 of the detent levers 467 of each punch element operating unit 451, so that direct reproduction of a card to be punched may be done without the use of the transposing mechanism. In this instance the perforations, in the card being produced, will be in the same position as the holes in the card being sensed.

In the general operation of the machine, the picker 82 (Fig. 4) functioning between zero and 70 degrees feeds a card to be sensed from the magazine 74 to the sensing chamber 132 against a stop 212 which is open from 11 to 58 degrees and closed thereafter during the major portion of the cycle, so that the card can be sensed simultaneously by all of the pins 136 which have been released for rising movement by the unlatching operation of the locking slides 146 upon actuation of the release bar 232 between 90 and 108 degrees. During this period of the cycle, the disabling mechanism 279 is operated to prevent the unlatching motion of the slide bars from being transferred to the pulse bars, specifically the lower slide bars 290. Between 81 and 90 degrees the card to be sensed has been centered in the sensing chamber by operation of the aligning means 249 and the released pins 136 that find holes in the card, position their studs 152 above the camming noses 153 of the windows 154 provided in the locking slides 146. Prior to movement of the slides 146, by operation of the restoring bars 170, a card to be punched has been fed from the magazine 438 by picker 439 to abut the "12" card stop which is raised by operation of the "12" cam of the group 482 between 129 and 165 degrees, being at card detaining position at about 147 degrees. The pin restoring bar 170 coinciding with the pins of the "12" row of holes of the card is pulled down by operation of the "12" cam of the group 202 between 140 and 160 degrees or at about 150 degrees and the pulse action through the transposing mechanism causes instantaneous operation of the punches to perforate the card in row "12" with holes corresponding to the holes in row "12" of the sensed card. The slides 146 are operated successively about every 18 degrees beginning approximately at 150 degrees in the cycle so that pulses occur at 150, 168, 186, 204, 222, 242, 260, 278, 296, 314, 333 and 350 degrees and correspond respectively with the rows "12, 11, 0, 1, 2, 3, 4, 5, 6, 7, 8, and 9" of data index positions in the sensed card. In synchronism with the operation of the slides 146, the stops 475 are raised and lowered successively about every 18 degrees beginning approximately at 147 degrees so that the rows "12, 11, 0, 1, 2, 3, 4, 5, 6, 7, 8, and 9" of the data index positions in the card to be punched are successively brought to position beneath the single row of punches 472 at about 147, 165, 183, 201, 219, 239, 257, 275, 293, 311, 330, and 347 degrees, respectively. When punching is finished, the card is fed by the skid rolls 424 to a pair of eject rolls, which is indicated as at 430 in Fig. 7, and from which the card may be dropped into a discharge pocket. It is evident that the sensing and punching operations are accomplished within a short time period and that only a single line of punches need be employed to reproduce data designation perforations in any field or zone of a record.

While there has been shown and described the fundamental novel features of the invention, it will be understood that various omissions, substitutions and changes in the form and details of the device illustrated, and in its operation, may be made by those skilled in the art without departing from the spirit of the invention. It is the intention, therefore, to be limited only as indicated by the scope of the following claims.

What I claim as new, and desire to secure by Letters Patent, is:

1. In a device of the character described, a sensing mechanism including spaced rows of pins for sensing a record having data designation perforations aligned in columns, means for moving the pins in one direction simultaneously to sense the entire record, means for moving the pins in the opposite direction in row by row sequence, lock slides operated by the movement in said opposite direction of the pins sensing perforations in the record, transposing means including spaced upper and lower left bars arranged in intersecting relation to each other, upper and lower slide bars connected to said upper and lower lift bars respectively, means controlled by the movement of said lock slides for actuating the lower slide bars to raise the lower lift bars, pin means positioned between the upper and lower lift bars at the points of intersection thereof for transferring the movement of said lower lift bars to the upper lift bars selectively to actuate the connected upper slide bars, rows of record stops spaced to correspond with the spacing of said rows of sensing pins, means for moving said stops to record arresting position in row by row sequence, means for feeding a record against said stops, a single row of punch elements, power means normally ineffective for actuating said elements, and means operated by a movement of said upper slide bars for rendering said power means effective whereby data sensed is punched in selected locations on the record being produced.

2. In a device as set forth in claim 1 wherein said pin means includes trays removably positioned between said lift bars and having openings therein corresponding to the points of intersection of said bars and pins movably mounted in selected openings in the tray to provide a moving connection between selected lift bars.

3. In a machine of the character described, a punch for perforating a record, a constantly rotating fluted shaft, a punch ring having an undulate periphery and internal teeth, a pinion meshing with the flutes of the shaft and the teeth of the ring, punch operating means engaging a hollow of said undulate periphery for yieldably holding said ring stationary whereby the pinion is given an orbital movement by and relatively to said shaft, a pinion ring on which said pinion is pivoted, said pinion ring having a notched periphery and being free to rotate with the orbital movement of said pinion, and detent means for momentarily engaging the notched periphery of the pinion ring to stop the rotation of the latter and the orbital movement of said pinion, whereby the latter will rotate the punch ring and a crest of the undulate surface thereof will actuate said punch operating means.

4. A card punch comprising a sensing mechanism including pins, means for moving the pins in one direction simultaneously to sense a card having data designating perforations arranged in vertical columns and horizontal rows, means for moving the perforation detecting pins in the opposite directions in row by row sequence, card stops spaced in accordance with the spacing between horizontal rows of data designation positions, means for moving said stops to card arresting position in row by row sequence, means for feeding a card against said stops, punch elements arranged in a single row, power means normally ineffective for actuating said elements, impulse conveying means responsive to the motion of said pins in said opposite direction, and means operated by said conveying means for rendering said power means effective.

5. In a machine of the character described, a sensing mechanism including spaced rows of pins for sensing a record having data designation perforations aligned in columns, means for moving the pins in one direction simultaneously to sense the entire record, means for moving the pins in the opposite direction in row by row sequence, pin releasing lock slides operated by the movement in said opposite direction of the pins finding holes in the record; punch means, movement transposing means actuated by said lock slide for controlling the operation of said punch means, means independent of said pins for moving said lock slide and means intermediate the lock slide and the transposing means for rendering the movement of said slide by said independent means ineffective to actuate said transposing means.

6. A record punch comprising a sensing mechanism including pins, means for moving the pins in one direction simultaneously to sense a whole record having data designating perforations arranged in row forming columns, means for moving the pins in the opposite direction in row by row sequence, lock slides operated by the movement of the pins in said opposite direction that have found holes in the record, punch means including a single row of punch elements, movement transfer means controlling the operation of said punch means from said slides, record stop means coacting with said punch means including stops corresponding to each row of data perforations in the sensed record and means for moving the record to be punched successively against said stops to bring each row of data designations in succession beneath said single row of punch elements.

7. A record punch comprising a sensing mechanism including pins, a first means for moving the pins in one direction simultaneously to sense a whole record having data designating perforations arranged in row forming columns, a second means for moving the pins in the opposite direction in row by row sequence, slides operated by the movement of pins in said opposite direction that have found holes in the record, punch means including a single row of punch elements, means controlled by the operation of said slides for actuating said punch means, a record stop means corresponding to each row of data perforation positions in the sensed record, means for raising and lowering said stops in succession, means for moving the record to be punched against the raised stops to bring each row of data designations in succession beneath said single row of punch elements and means for operating the second pin moving means and the stop raising and lowering means in synchronism.

8. In a machine of the class described, including dual record card feeding means, means for conveying a card from one of said feeding means to a sensing position, and means for conveying a second card from the other of said feeding means to a punching position; the combination of yieldable card engaging pins for simultaneously sensing all of the data perforations in the first mentioned card; means for retracting the sensing pins in row-by-row order and thereby effecting a data designative impulse; a single row of card punching means at said punching station; means including stops for successively positioning a card with the index positions thereof in row by row order; power means normally ineffective for operating said punching means; means operated by said data designative impulse for rendering said power means effective; and means for operating the stops in synchronism with the operation of said retracting means.

9. In a machine of the class described, including dual record card feeding means, means for conveying a card from one of said feeding means to a sensing position, means for conveying a second card from the other of said feeding means to a punching station, and stop means for positioning a card with the index positions thereof in row by row order at a punching station; the combination of a plurality of columnarly arranged yieldable sensing pins; a latch slide associated with said sensing pins and normally effective for latching said pins in an ineffective position; means operative to actuate said latch member and thereby release said pins for sensing columnarly arranged data perforations in the card; means associated with each row of said pins and operative in accordance with the positioning of the second mentioned card at said punching station for retracting those of said pins sensing data perforations; means whereby each retracted pin actuates said latch member to effect data designative impulses; a punching element at said punching station; a lever operable for actuating said punch; cam means for operating said lever; a power gear normally ineffective for rotating said cam; and means operated by said designative impulses for rendering said power gear effective; and means operative during the pin releasing actuation of said locking member to prevent the transmission of such actuation as a data designative impulse to the means for rendering said power shaft effective.

10. In a machine of the class described, including a record card sensing chamber, and means for retaining a card fed thereto; the combination of sensing pin means for simultaneously sensing all of the data perforations in said card; means for retracting the sensing means row by row; movement transferring means; latch slide means movable to release said pins for movement in one direction and actuated by movement of said pins in the opposite direction for producing a data designative impulse in said transferring means; and means operable during the pin releasing action of said slide means to disable said movement transferring means.

11. In a machine of the class described, a record card sensing chamber, stop means for retaining a card fed therein, a plurality of spring urged sensing pins disposed in column forming rows, a locking member associated with said sensing pins and normally effective for locking the pins in a depressed position, means operative to actuate said locking member and thereby release said pins for sensing data perforations in said card, means for retracting in row by row sequence the pins that have sensed perforations in the various columns of the record, means whereby the retracted pins of each row actuate said locking member, movement transfer means adapted to transmit said actuations as data impulses, and means for disabling said transfer means when the locking member is actuated in pin releasing operation.

12. In a machine of the class described, including a record card sensing chamber, and means for retaining a card therein; the combination of a plurality of columnarly arranged resilient sensing pins; locking members associated with said sensing pins and normally effective for locking the pins in a depressed position; means for operating said locking member to release all of said pins for sensing columnarly arranged data perforations in said card simultaneously; means for successively retracting groups of pins corresponding to single rows of perforations, means on said pins for actuating said locking members when the pins are retracted, means adapted to transmit said actuations as impulses, and means operative during the pin releasing action of said locking member to disable said transmitting means.

13. In a machine of the class described, including a record card sensing chamber, and means for retaining a card therein; the combination of a plurality of resilient sensing pins arranged in columns and rows; a plurality of locking slides each commonly associated with the pins of a column thereof and normally effective for locking the same in depressed position; a bail operative to actuate said plurality of slides and thereby release said pins for finding and entering data perforations in a card in said chamber; a plurality of retract bars each commonly associated with the pins of a row thereof and operative individually whereby each of said pins finding a data perforation is retracted to actuate its related locking slide; a plurality of transmitting members each associated with one of said slides and adapted to receive the actuations thereof as data designative impulses; and means operative during the pin releasing actuations of said slides whereby said plurality of transmitting members is disassociated therewith to prevent reception of such actuations as data designative impulses.

14. In a machine of the class described, including a record card sensing chamber, and means for retaining a card therein; the combination of a plurality of resilient sensing pins arranged in columns and rows and each including a laterally extending extrusion and a stepped portion; a plurality of locking slides each associated with a column of said pins and including a plurality of apertures having cam noses for cooperating normally with the extrusions on said pins to lock the latter in a depressed position; a bail operative to actuate said plurality of slides and thereby release said pins for finding and entering data perforations in a card in said chamber; a plurality of individually operative retract bars each associated commonly with the pins of a row thereof and cooperative with the steps therein for retracting those pins which find data perforations, the extrusion on each retracted pin being effective to cooperate with its related cam nose to thereby distinctively actuate its related locking slide; a plurality of commonly pivoted levers each normally having an arm thereof associated with one of said locking slides and adapted to receive and transmit the actuations thereof as data designative impulses; and means operative during the pin releasing actuations of said slides for moving the common pivot to thereby disassociate said levers and slides to prevent reception and transmission of such actuations as data designative impulses.

15. In a machine as set forth in claim 5 wherein the punch means includes a punch element; means operable to actuate said element; a cam associated with said actuating means and rotatable for operating the same, including internal gearing, a power gear in constant rotation and disposed within said cam; and a planetary gear meshing with said power gear and internal gearing, said planetary gear being adapted normally to move annularly in said internal gear and when stopped to effect the rotation of said cam.

16. In a machine of the class described; punching means; comprising a punch element; a lever operable to actuate said element; a multilobed cam associated with said lever and rotatable for operating same, and including internal gear teeth; a gear-toothed power shaft in constant rotation; a ratchet wheel supported loosely on said shaft in a plane adjoining that of said cam and including a breached annular shoulder substantially coplanar with the cam and whereon said cam is loosely supported; a planetary gear also substantially coplanar with said cam and being disposed in the breach of said shoulder and mounted to the side of said ratchet, said planetary gear meshing with said power shaft and the gear teeth in said cam and being adapted to race normally in said cam and thereby rotate said ratchet and to drive said cam when the ratchet is stopped; and a pawl normally resiliently held out of engagement with said ratchet wheel and operable for engaging and stopping same.

References Cited in the file of this patent

UNITED STATES PATENTS

| | | |
|---|---|---|
| 1,882,859 | Mills | Oct. 18, 1932 |
| 1,962,750 | Read | June 12, 1934 |
| 2,062,456 | Johnstone | Dec. 1, 1936 |
| 2,108,681 | Lasker | Feb. 15, 1938 |
| 2,131,895 | Kolm et al. | Oct. 4, 1938 |
| 2,251,221 | Cleven | July 29, 1941 |
| 2,387,828 | Braun et al. | Oct. 30, 1945 |
| 2,394,604 | Ford | Feb. 12, 1946 |
| 2,576,152 | Stimpson et al. | Nov. 27, 1951 |